(12) United States Patent
Rogers et al.

(10) Patent No.: US 10,927,191 B2
(45) Date of Patent: Feb. 23, 2021

(54) COAGULATION OF CHITIN FROM IONIC LIQUID SOLUTIONS USING KOSMOTROPIC SALTS

(71) Applicants: THE BOARD OF TRUSTEES OF THE UNIVERSITY OF ALABAMA, Tuscaloosa, AL (US); 525 Solutions, Inc., Tuscaloosa, AL (US)

(72) Inventors: Robin D. Rogers, Tuscaloosa, AL (US); Waduge Indika S. Galpothdeniya, Tuscaloosa, AL (US); Julia L. Shamshina, Tuscaloosa, AL (US); Oleksandra Zavgorodnya, Tuscaloosa, AL (US)

(73) Assignees: THE BOARD OF TRUSTEES OF THE UNIVERSITY OF ALABAMA, Tuscaloosa, AL (US); 525 Solutions, Inc., Tuscaloosa, AL (US)

( * ) Notice: Subject to any disclaimer, the term of this patent is extended or adjusted under 35 U.S.C. 154(b) by 0 days.

(21) Appl. No.: 15/862,805

(22) Filed: Jan. 5, 2018

(65) Prior Publication Data
US 2018/0194864 A1   Jul. 12, 2018

Related U.S. Application Data

(60) Provisional application No. 62/443,019, filed on Jan. 6, 2017.

(51) Int. Cl.
| | | |
|---|---|---|
| *C08B 37/00* | (2006.01) | |
| *C08B 37/08* | (2006.01) | |
| *C07B 63/04* | (2006.01) | |
| *B01D 11/04* | (2006.01) | |
| *C08L 5/08* | (2006.01) | |
| *C07B 63/00* | (2006.01) | |

(52) U.S. Cl.
CPC .......... *C08B 37/0003* (2013.01); *B01D 11/04* (2013.01); *C07B 63/00* (2013.01); *C07B 63/04* (2013.01); *C08B 37/003* (2013.01); *C08L 5/08* (2013.01)

(58) Field of Classification Search
None
See application file for complete search history.

(56) References Cited

U.S. PATENT DOCUMENTS

| | | |
|---|---|---|
| 1,943,176 A | 1/1934 | Graenacher |
| 3,892,731 A | 7/1975 | Austin |
| 4,063,017 A | 12/1977 | Tsao et al. |
| 4,097,666 A | 6/1978 | Johnson et al. |
| 4,188,263 A | 2/1980 | Hulsmann et al. |
| 4,520,105 A | 5/1985 | Sinner et al. |
| 4,522,934 A | 6/1985 | Shum et al. |
| 4,970,156 A | 11/1990 | Avrameas et al. |
| 5,077,414 A | 12/1991 | Arduengo et al. |
| 5,200,248 A | 4/1993 | Thompson et al. |
| 5,679,146 A | 10/1997 | Kalt et al. |
| 5,683,832 A | 11/1997 | Bonhote et al. |
| 5,714,536 A | 2/1998 | Ziolo et al. |
| 5,747,125 A | 5/1998 | Markulin et al. |
| 5,792,399 A | 8/1998 | Meister et al. |
| 5,827,602 A | 10/1998 | Koch et al. |
| 5,836,910 A | 11/1998 | Duffy et al. |
| 5,836,970 A | 11/1998 | Pandit et al. |
| 5,856,513 A | 1/1999 | Ue et al. |
| 6,124,273 A | 9/2000 | Drohan et al. |
| 6,376,712 B2 | 4/2002 | Narizuka et al. |
| 6,451,220 B1 | 9/2002 | Ziolo et al. |
| 6,515,075 B1 | 2/2003 | Topolkaraev et al. |
| 6,613,310 B1 | 9/2003 | Campbell et al. |
| 6,808,557 B2 | 10/2004 | Holbrey et al. |
| 6,824,599 B2 | 11/2004 | Swatloski et al. |
| 6,846,924 B1 | 1/2005 | Malmgren et al. |
| 6,936,974 B2 | 8/2005 | Melis et al. |
| 6,939,974 B2 | 9/2005 | Earle et al. |
| 7,198,026 B2 | 4/2007 | Masuta et al. |
| 7,198,695 B2 | 4/2007 | Kettenbach et al. |

(Continued)

FOREIGN PATENT DOCUMENTS

| | | |
|---|---|---|
| CA | 2479941 | 10/2003 |
| CH | 153446 | 6/1932 |

(Continued)

OTHER PUBLICATIONS

Jayakumar et al. "Biomedical applications of chitin and chitosan based nanomaterial—a short review," Carbohydrate Polymers, 2010, 82, 227-232.

Al-Adhami, et al., "Immobilization of Wood-Rotting Fungi Laccases on Modified Cellulose and Acrylic Carriers", J. Process Biochemistry, 37:1387-1394 (2002).

Anderson, et al., "Structure and Properties of High Stability Geminal Dicationic Ionic Liquids", J. Amer. Chem. Soc., 127(2):593-604 (2005).

Arakawa, et al., "Mechanism of Protein Salting in and Salting Out by Divalent Cation Salts: Balance between Hydration and Salt Binding" Biochemistry, 23, 1984, 5912-5923.

(Continued)

*Primary Examiner* — Dale R Miller
(74) *Attorney, Agent, or Firm* — Meunier Carlin & Curfman LLC

(57) ABSTRACT

Methods for separating chitin from a chitinous biomass are described, the methods comprising contacting the chitinous biomass with an ionic liquid to form a mixture comprising chitin; contacting the mixture with an aqueous solution of a kosmotropic salt, thereby coagulating the chitin and forming an biphasic system comprising an ionic liquid-chitin phase and an aqueous kosmotropic salt phase; separating the ionic liquid-chitin phase from the aqueous kosmotropic salt phase; and collecting the chitin from the separated ionic liquid-chitin phase, thereby forming a recycled ionic liquid.

15 Claims, 10 Drawing Sheets

(8 of 10 Drawing Sheet(s) Filed in Color)

(56) References Cited

U.S. PATENT DOCUMENTS

| | | |
|---|---|---|
| 7,253,289 B2 | 8/2007 | Ren et al. |
| 7,550,520 B2 | 6/2009 | Daly et al. |
| 8,030,030 B2 | 10/2011 | Paripati et al. |
| 8,038,840 B2 | 10/2011 | Li et al. |
| 8,044,120 B2 | 10/2011 | D'Andola et al. |
| 8,110,667 B2 | 2/2012 | Zhang et al. |
| 8,182,557 B2 | 5/2012 | Argyropoulos |
| 8,986,501 B2 | 3/2015 | Li et al. |
| 9,096,743 B2 | 8/2015 | Rogers et al. |
| 9,683,309 B2 | 6/2017 | Swatloski et al. |
| 2001/0024716 A1 | 9/2001 | Chen et al. |
| 2002/0010291 A1 | 1/2002 | Murphy |
| 2002/0056633 A1 | 5/2002 | Westman et al. |
| 2003/0059604 A1 | 3/2003 | Hattori et al. |
| 2003/0157351 A1 | 8/2003 | Swatloski et al. |
| 2003/0165445 A1 | 9/2003 | Malnou et al. |
| 2003/0233742 A1 | 12/2003 | Jones et al. |
| 2004/0038031 A1 | 2/2004 | Holbrey et al. |
| 2004/0077519 A1 | 4/2004 | Price et al. |
| 2004/0091557 A1 | 5/2004 | Hamann |
| 2005/0058694 A1 | 3/2005 | Nielsen |
| 2005/0061457 A1 | 3/2005 | Skuratowicz et al. |
| 2005/0123851 A1 | 6/2005 | Shinbori et al. |
| 2005/0194561 A1 | 9/2005 | Davis |
| 2005/0196671 A1 | 9/2005 | Paonessa et al. |
| 2005/0285073 A1 | 12/2005 | Singh et al. |
| 2005/0288484 A1 | 12/2005 | Holbrey et al. |
| 2006/0118755 A1 | 6/2006 | Fujioka et al. |
| 2006/0128996 A1 | 6/2006 | Vaultier et al. |
| 2006/0194197 A1 | 8/2006 | Spangler et al. |
| 2006/0241287 A1 | 10/2006 | Hecht et al. |
| 2007/0006774 A1 | 1/2007 | Rogers et al. |
| 2007/0093462 A1 | 4/2007 | Rogers et al. |
| 2007/0112185 A1 | 5/2007 | Myllymaki et al. |
| 2007/0215300 A1 | 9/2007 | Upfal et al. |
| 2007/0225191 A1 | 9/2007 | Scheibel et al. |
| 2007/0265434 A1* | 11/2007 | Lehoux .............. C08B 37/003 536/20 |
| 2008/0023162 A1 | 1/2008 | Myllymaki et al. |
| 2008/0097001 A1 | 4/2008 | Miraftab et al. |
| 2008/0190013 A1 | 8/2008 | Argyropoulos |
| 2008/0227162 A1 | 9/2008 | Varanasi et al. |
| 2008/0241536 A1 | 10/2008 | Luo et al. |
| 2009/0010983 A1 | 1/2009 | Melvik et al. |
| 2009/0088564 A1 | 4/2009 | Luo et al. |
| 2009/0099353 A1 | 4/2009 | Miraftab et al. |
| 2009/0215720 A1 | 8/2009 | Thibodeau et al. |
| 2009/0221813 A1 | 9/2009 | Moellmann et al. |
| 2010/0081798 A1 | 4/2010 | Balensiefer et al. |
| 2010/0087369 A1 | 4/2010 | Cutsem et al. |
| 2010/0112646 A1 | 5/2010 | Balensiefer et al. |
| 2010/0143435 A1 | 6/2010 | Dagger et al. |
| 2010/0170504 A1 | 7/2010 | Zhang et al. |
| 2010/0196967 A1 | 8/2010 | Edye et al. |
| 2010/0239673 A1 | 9/2010 | Linhardt et al. |
| 2010/0249432 A1 | 9/2010 | Siemer et al. |
| 2010/0287826 A1 | 11/2010 | Hoffman et al. |
| 2010/0319862 A1 | 12/2010 | Rahman et al. |
| 2011/0180951 A1 | 7/2011 | Teo et al. |
| 2012/0115729 A1 | 5/2012 | Qin et al. |
| 2012/0216705 A1 | 8/2012 | Rogers et al. |
| 2012/0245336 A1 | 9/2012 | Daly et al. |
| 2013/0252285 A1* | 9/2013 | Blanch .............. C08B 1/003 435/99 |
| 2014/0027938 A1 | 1/2014 | Swatloski et al. |
| 2016/0060363 A1* | 3/2016 | Barber .............. C08L 5/08 536/20 |
| 2016/0082141 A1 | 3/2016 | Rogers et al. |

FOREIGN PATENT DOCUMENTS

| | | |
|---|---|---|
| CN | 1380110 | 11/2002 |
| DE | 2703703 | 1/1977 |
| EP | 0780391 | 6/1997 |
| EP | 0904433 | 3/1999 |
| EP | 1222918 | 7/2002 |
| EP | 1854786 | 11/2007 |
| JP | 58183601 | 10/1983 |
| JP | 63056501 | 3/1988 |
| JP | 64017649 | 1/1989 |
| JP | 80089796 | 4/1996 |
| JP | 10265674 | 10/1998 |
| JP | 2000314035 A | 11/2000 |
| JP | 2002290011 | 10/2002 |
| JP | 2003171144 | 6/2003 |
| JP | 2003335887 | 11/2003 |
| WO | 9420521 A1 | 9/1994 |
| WO | 9521871 A1 | 8/1995 |
| WO | 9606593 A1 | 3/1996 |
| WO | 0032658 A1 | 6/2000 |
| WO | 0181436 A1 | 11/2001 |
| WO | 02079269 A1 | 10/2002 |
| WO | 02100360 A1 | 12/2002 |
| WO | 02102586 A2 | 12/2002 |
| WO | 03029329 A2 | 4/2003 |
| WO | 03041692 A1 | 5/2003 |
| WO | 03074031 A1 | 9/2003 |
| WO | 2004027897 A1 | 4/2004 |
| WO | 2005017252 A1 | 2/2005 |
| WO | 2006097571 A1 | 9/2006 |
| WO | 2006116126 A2 | 11/2006 |
| WO | 2007005388 A2 | 1/2007 |
| WO | 2007063327 A1 | 6/2007 |
| WO | 2007111605 A1 | 10/2007 |
| WO | 2009105236 A1 | 8/2009 |
| WO | 2010056790 A1 | 5/2010 |
| WO | 2010141470 A2 | 12/2010 |
| WO | 2011056924 A1 | 5/2011 |
| WO | 2014001856 A1 | 1/2014 |

OTHER PUBLICATIONS

Armstrong, et al., "Structure and properties of high stability geminal dicationic ionic liquids", J. Amer. Chem. Soc., 127(2), 2005, 593-604.

Ast, et al., "Efficient Assembly of Peptomers on Continuous Surfaces", Tetrahedron Lett. 40:4317-4318 (1999).

Axegard, "The Future Pulp Mill-A Biorefinery?" Presentation at 1st International Biorefinery Workshop, Washington, DC. Jul. 20-21, 2005.

Barber, et al., "A 'green' Industrial Revolution: Using Chitin towards Transformative Technologies", Pure Appl. Chem. 85, 2013, 1693-1701.

Barber, et al., "Electrospinning of Chitin Nanofibers Directly from an Ionic Liquid Extract of Shrimp Shells", Green Chem. 15, 2013, 601-607.

Barber, et al., "Surface Modification of Ionic Liquid-Spun Chitin Fibers for the Extraction of Uranium from Seawater: Seeking the Strength of Chitin and the Chemical Functionality of Chitosan", Green Chem. 16, 2014, 1828-1836.

Barber, Patrick S., "Coagulation of Chitin and Cellulose from 1-Ethyl-3-methylimidazolium Acetate Ionic-Liquid Solutions Using Carbon Dioxide", Angew. Chem. Int. Ed., v. 52, 2013, 12350-12353.

Bartlett, et al., "Chitin, Cholera, and Competence", Science, 310, 2005, 1775-1777.

Benton, et al., "Effect of Room-Temperature Ionic Liquids as Replacements for Volatile Organic Solvents in Free-Radical Polymerization", Ionic Liquids, 818:125-133 (2002).

Biedron, et al., "Ionic Liquids as reaction Media for Polymeriazation Processes: Atom Transfer Radical Polymerization (ATRP) of Acrylates in Ionic Liquids", Polymer Int'l., 52(10):1584-1588 (2003).

Black, et al., "The estimation of chitin and chitin nitrogen in crawfish waste and derived products", Analyst, 75, 1950, 185-189.

Blankemeyer-Menge, et al., "Simultaneous Multiple Synthesis of Protected Peptide Fragments on 'Allyl'-Functionalized Cellulose Disc Supports", Tetrahedron Lett. 29:5871-5874 (1988).

Bonhote, et al., "Hydrophobic, Highly Conductive Ambient-Temperature Molten Salts", Inorg. Chem., 35:1168-1178 (1996).

(56) References Cited

OTHER PUBLICATIONS

Bora, et al., "A Simple Method for Functionalization of Cellulose Membrane for Covalent Immoblization of Biomolecules", J. Membr. Sci., 250:215-222 (2005).
Bradford, "A Rapid and Sensitive Method for the Quantitation of Microgram Quantities of Protein Utilizing the Principle of Protein-Dye Binding" Anal. Biochem, 72, 1976, 248-254.
Bridges, et al., "Investigation of aqueous biphasic systems formed from solutions of chaotropic salts with kosmotropic salts (salt—salt ABS)," Green Chem., 9, 2007, 177-183.
Brugnerotto, et al., "An infrared investigation in relation with chitin and chitosan characterization", Polymer, 42, 2001, 3569-3580.
Carlin, et al., "Advances in Nonaqueous Chemistry", Mamantov et al. Eds., VCH Publishing, New York, 1994.
Cateto, et al., "Monitoring of lignin-based polyurethane synthesis by FTIR-ATR", Ind. Crops Prod., 27(2):168-174 (2008).
Cauchie, et al., "An Attempt to estimate crustacean chitin production in the hydrosphere", 1997, 32-39.
Chen, et al., "Enhanced mechanical properties of novel chitosan nanocomposite fibers", Carbohydrate Polmers, 86(3), 2011, 1151-1156.
Chesney, et al., "Amino-Derivatised Beaded Cellulose Gels, Novel Accessible and Biodegradable Scavenger Resins for Solution Phase Cominatorial Synthesis", Green Chem., 2:57-62 (2000).
Cho, et al., "Physicochemical Characteristics and Functional Properties of Various Commercial Chitin and Chitosan Products," J. Agric. Food. Chem, 46, 1998, 3839-3843.
Coghlan, "Mouldy dressings help wounds heal", New Scientist, 145 (1970), 1995, 21.
Deng, et al., "Phase Diagram of [Amim]Cl + Salt Aqueous Biphasic Systems and Its Application for [Amim]Cl Recovery", J. Chem. Eng. Data 54, 2009, 2470-2473.
Ding, Homogeneous synthesis and characterization of quaternized chitin in NaOH/urea aqueous solution, Carbohydrate Polymers, 87, 2012, 422-426.
Duan, et al., "High strength films with gas-barrier fabricated from chitin solution dissolved at low temperature," J.Mater. Chem. A, 1, 2013, 1867-187.
Dubbs, et al., "Solubility of vitamin E (alpha-tocopherol) and vitamin K3 (menadione) in ethanol-water mixture", Journal of Chemical & Engineering Data, 43(4), 1998, 590-591.
Dutta, et al., "Chitin and chitosan: Chemistry, properties and applications", Journal of Scientific & Industrial Research, 63, 2004, 20-31.
Earle, et al., "Ionic liquids. Green Solvents for the future", Pure Appl. Chem., 72(7), 2000, 1391-1398.
El Seoud, et al., "Applications of ionic liquids in carbohydrate chemistry: A window of opportunities", Biomacromol, 8(9), 2007, 2629-2647.
Endres, et al., "Ionic Liquids: Solvents for the Electrodeposition of Metals and Semiconductors", Chem. Phys. Chem., 3(2), 2002, 144-154.
Erdmenger, et al., "Homogeneous tritylation of cellulose in 1-Butyl-3-methylimidazolium chloride", Macromol. Biosci.7, 2007, 440-445.
Fan, et al., "Preparation and Properties of Alginate/Water-Soluble Chitin Blend Fibers", Journal of Macromolecular Science, Part A: Pure and Applied Chemistry, 42(6), 2005, 723-732.
Fannin, et al., "Properties of 1,3-Dialkylimidazolium Chloride-Aluminum Choride Ionic Liquids. 2. Phase Transitions, Densities, Electrical Conductivities, and Viscosities", J. Phys. Chem., 88, 1984, 2614-2621.
Fischer, et al., "Structural Changes of Cellulose Dissolved in Molten Salt Hydrates", 19th ACS National Meeting, San Francisco, CA, (abstract), 2000.
Fort, et al., "Can ionic liquids dissolve wood? Processing and analysis of lignocellulosic materials with 1-n-butyl-3-methylimidazolium chloride", Green Chem., 9, 2007, 63-69.
Freire, et al., "Aqueous biphasic systems: a boost brought about by using ionic liquids," Chem. Soc. Rev. 41, 2012, 4966-4995.

Froehner, et al., "Properties of the Glycoprotein Laccase Immobilized by Two Methods", Acta Chem Scand B, 29, 1975, 691-694.
Fukaya, et al., "Cellulose dissolution with polar ionic liquids under mild conditions: required factors for anions", Green Chem., 10, 2008, 44-46.
Fukaya, et al., "Superior Solubility of Polysaccharides in Low Viscosity, Polar, and Halogen-Free 1,3-Dialkylimidazolium Formates", Biomacromolecules, 7, 2006, 3295-3297.
Fukuyama, et al., "A Copper-Free Sonogashira Coupling Reaction in Ionic Liquids and Its Application to a Microflow System for Efficient Catalyst Recycling", Org. Lett., 4(10), 2002, 1691-1694.
Gallezot, et al., "Process options for converting renewable feedstocks to bioproducts", Green Chem., 9, 2007, 295-302.
Gelbrich, et al., "Colloidal Structures Based on Topochemically Modified Cellulose", Papier (Heidelberg), 52, 1998, 755-758.
Gemeiner, "Immobilized Enzymes, Organelles and Cells, in Enzyme Engineering, Gemeiner, Ed.", Ellis Horwood Series in Biochemistry and Biotechnology, Ellis Horwood Limited: West Sussex, England, 1992, 158-179.
Gordon, et al., "Fused Organic Salts. 8. Properties of Molten Straight-Chain Isomers of Tetra-n-Pentylammonium Salts", J. Amer. Chem. Soc., 100(24), 1978, 7445-7454.
Gutowski, et al., "Controlling the Aqueous Miscibility of Ionic Liquids: Aqueous Biphasic Systems of Water-Miscible Ionic Liquids and Water-Structuring Salts for Recycle, Metathesis, and Separations", J. Am. Chem. Soc., 125, 2003, 6632-6633.
Hackman, et al., Austr. J. Biol. Chem., 18, 1965, 941-965.
Harkin, et al., "Lignification in Trees: Indication of Exclusive Peroxidase Participation", Science, 180, 1973, 296-98.
Hasegawa, et al., "New Pretreatment Methods Combining a Hot Water Treatment and Water/Acetone Extraction for Thermo-Chemical Conversion of Biomass", Energy and Fuels, 18, 2004, 755-760.
Heinze, et al., "Unconventional Methods in Cellulose Functionalization", Prog. Polym. Sci., 26, 2001, 1689-1762.
Hirano, et al., "An Improved Method for the Preparation of Colloidal Chitin by using Methanesulfonic Acid", Agric. Biol. Chem., 52, 1988, 2111-2112.
Hirayama, "Rapid Confirmation and Revision of the Primary Structure of Bovine Serum Albumin by ESIMS and Frit-FAB LC/MS", Biochem. Biophys. Comm., 173, 1990, 639-646.
Holbrey, et al., "Mercury(II) partitioning from aqueous solutions with a new, hydrophobic ethylene-glycol functionalized bis-imidazolium ionic liquid", Green Chem., 5, 2003, 129-135.
Holbrey, et al., "The Phase Behaviour of 1-Alkyl-3-Methlimidazolium Tetrafluoroborates; Ionic Liquids and Ionic Liquid Crystals", J. Chem. Soc. Dalton Trans., 1999, 2133-2139.
Hoogmoed, et al., "Fourier transform infrared spectroscopy studies of alginate-PLL capsules with varying compositions", J. Biomed Mater Res A, 67, 2003, 172-178.
Horowitz, Ed, "Official Methods of Analysis of the Association of Official Analytical Chemists, 13a ed.", AOAC International, Washington, DC, pp. 14-15 (1980).
Huddleston, et al., "Characterization and Comparison of Hydrophilic and Hydrophobic Room Temperature Ionic Liquids Incorporating the Imidazolium Cation", Green Chem., 3, 2001, 156-164.
Huddleston, et al., "Room Temperature Ionic Liquids as Novel Media for 'Clean' Liquid-Liquid Extraction", Chem. Commun., 1998, 1765-1766.
Husemann, et al., "Homogeneous Acetylation of Cellulose", Buletinul Institutului Politehnic Din Lasi, 1(1-2), 1970, 47-51.
Illanes, et al., "Immobilization of Lactase and Invertase on Crosslinked Chitin, in Bioreactor Immobilized Enzymes and Cells", Moo-Young, Ed., Elsevier Applied Science: London, 1998, 233-249.
Illanes, "Stability of Biocatalysts", Elec. J. Biotechnol., 2(1), 1999, 1-9.
Jayakumar, et al., "Novel chitin and chitosan materials in wound dressing", Biomedical Engineering, Trends in Materials Science, 2011, 23 pages.

(56) References Cited

OTHER PUBLICATIONS

Jung, et al., "Production of chitin from red crab shell waste by successive fermentation with Lactobacillus paracasei KCTC-3074 and Serratia marcescens FS-3," Carbohydrate Polymers, 68, 2007, 746-750.
Kadokawa, et al., "A facile preparation of gel materials from a solution of cellulose in ionic liquid", Carbohydrate Research, 343, 2008, 769-772.
Kalra, et al., "Confined assembly of asymmetric block-copolymer nanofibers via multiaxial jet electrospinning", Small, 5, 2009, 2323-2332.
Kenealy, et al., "Pretreatments for Converting Wood into Paper and Chemicals, Materials, Chemicals and Energy from Forest Biomass", Argyropoulos, D.; ACS Symposium Series; American Chemical Society, Washington, DC, chapter 25, 2007, 392-408.
Khor, et al., "Implantable applications of chitin and chitosan", Biomaterials, 24(13), 2003, 2339-2349.
Kilpeläinen, et al., "Dissolution of wood in ionic liquids", J. Agric. Food Chem., 55, 2007, 9142-9148.
Kirk-Othmer, "Encyclopedia of Chemical Technology, $4^{th}$" Ed. vol. 5, 1993, 476-563.
Krajewska, "Application of Chitin- and Chitosan-based Materials for Enzyme Immobilizations: A Review", Enz. Microb. Techno., 35, 2004, 126-139.
Kumar, "A review of chitin and chitosan applications", React. Funct. Polym. 46, 2000, 1-27.
Lau, et al., "Dissolution of Candida Antarctica Lipase B in Ionic Liquids: Effects on Structure and Activity", Green Chem., 6, 2004, 483-487.
Lawrie, "Interactions between alginate and chitosan biopolymers characterized using FTIR and XPS", Biomacromolecules, 8, 2007, 2533-2541.
Lee, et al., "Advances in chitosan material and its hybrid derivatives: A review", The Open Biomaterials Journal, 1, 2009, 10-20.
Lee, et al., "Ionic Liquid-Mediated Selective Extraction of Lignin from wood leading to enhanced enzymatic cellulose hydrolysis", Biotech. and Bioeng 102(5), 2009, 1368-1376.
Leipner, et al., "Structural Changes of Cellulose Dissolved in Molten Salt Hydrates", Macromol Chem Phys, 201(15), 2000, 2041-2049.
Liebert, et al., "Tailored Cellulose Esters: Synthesis and Structure Determination", Biomacromolecules, 6, 2005, 333-340.
Lim, et al., "Biomedical-grade chitosan in wound management and its biocompatibility in vitro", Biopolymers, Chapter 2, 2010, 19-36.
Linko, et al., "Cellulose Bead Entrapped Microbial Cells Biotechnical Applications", Enzyme Microb. Technol., 1:26-30 (1979).
Loupy, et al., "New solvent-free organic synthesis using focused microwaves", Synthesis, pp. 1213-1234 (1998).
Ma, et al., "Reverse Atom Transfer Radical Polymerization of Methyl Methacrylate in Room-Temperature Ionic Liquids", J. Polymer Sci. Pt. A-Polymer Chem., 41:143-151 (2003).
Mahmoud, et al., "Unconventional approach for demineralization of deproteinized crustacean shells for chitin production", Arab. Am. J. Biochem. Biotechnol. 2007, 3, 1-9.
Maia, et al., "Cellulose Organic Solvents. 1. The Structure of Anhydrous N-Methylmorpholine N-Oxide and N-Methylmorphline N-Oxide Monohydrate", Acta Cryst., B37:1858-1862 (1981).
Mais, et al., "Modification of Cellulose Using Cellulose p-Toluene-Sulfonates as Intermediates", Zeszyty Naukowe Politechniki Slaskiej Chemm., 140:121-125 (1999).
Manangeeswaran, et al., "Degradation of indulin, a kraft pine lignin, by Serratia marcescens", J. Environ. Sci. Health, Part B: Pesticides, Food Contaminants, and Agricultural Wastes, 42(3):321-327 (2007).
Marson, et al., "A Novel, Efficient Procedure for Acylation of Cellulose Under Homogeneous Solution Conditions", J. Appl. Polymer Sci., 74:1355-1360 (1999).
Mathews, et al., "Palladium catalysed Suzuki cross-coupling reactions in ambient temperature ionic liquids", Chem. Commun., 1249-1250 (2000).

Maxim, et al., "Reinforced magnetic cellulose fiber from ionic liquid solution", Nanomater Energy, 2012, 1, 225-236.
Mazurkiewicz, et al., "Conducting Polymer Electrochemistry in Ionic Liquids", Synthetic Metals, 135:31-32 (2003).
Mevarech, et al., "Halophilic enzymes: proteins with a grain of salt," Biophys. Chem. 2000, 86, 155-164.
Miao, et al., "Electrospinning from room temperature ionic liquids for biopolymer fiber formation", Green Chem, 2010, 12, 1883-1892.
Min, et al., "Chitin and chitosan nanofibers: electrospinning of chitin and deacetylation of chitin nanofibers", Polymer, 45:7137-7142 (2004).
Mingos, "Microwaves in Chemical Syntheses", Chem. Indus., pp. 596-599 (1994).
Mori, et al., "Effect of chitin and its derivatives on the proliferation and cytokine production of fibroblasts in vitro", Biomaterials, 1997, 18(13), 947-951.
Nara, et al., "Lipase-Catalysed Polyester Synthesis in 1-Butyl-3-Methylimidazolium Hexafluorophosphate Ionic Liquid", Tetrahedron Lett. 44:1371-1373 (2003).
Neves, et al., "Evaluation of Cation Influence on the Formation and Extraction Capability of Ionic-Liquid-Based Aqueous Biphasic Systems," Phys. Chem. B 2009, 113, 5194-5199.
Ngo, et al., "Thermal Properties of Imidazolium Ionic Liquids," Thermochimica Acta, 357-358:97-102 (2000).
No, et al., "Isolation and characterization of chitin from crawfish shell waste," J. Agric. Food Chem. 1989, 37, 575-579.
No, et al., "Control of foam formation by antifoam during demineralization of crustacean shell in preparation of chitin", Food Chem, 1998, 46, 3844.
Noishiki, et al., "Alkali-Induced Conversion of β-Chitin to r-Chitin," Biomacromolecules 2003, 4, 896-899.
Ohno, et al., "A New Type of Polymer Gel Electrolyte: Zwitterionic Liquid/Polar Polymer Mixture", Electrochimica Acta, 48:2079-2083 (2003).
Okamato, et al., "Synthesis, Spectra, and Reactions of N-Triphenylmethylpyridinium Salts. Reactions of Triphenylmethyl Chlordie with Pyridine Under High Pressure", J. Org. Chem., 35(11):3752-3756 (1970).
Padhye, et al., "Cellulose Degradation in Xanthate Process", J. App. Polymer Sci., 36:1475-1478 (1988).
Park, et al., "Applications of Chitin and its Derivatives in Biological Medicine", International Journal of Molecular Sciences, 2010, 11, 5152-5164.
Percot, et al., "Optimization of Chitin Extraction from Shrimp Shells", Biomacromolecules, 4:12-18 (2003).
Perrier, et al., "Reversible Addition—Fragmentation Chain Transfer Polymerization of Methacrylate, Acrylate and Styrene Monomers in 1-Alkyl-3-Methylimidazolium Hexfluorophosphate", European Polymer J., 39(3):417-422 (2003).
Pinkert, et al., "Alkanolamine Ionic Liquids and their inability to dissolve crystalline cellulose", Ind. Eng. Chem. Res. 2010, 49(22), 11809-11813.
Piyakulawat, et al., "Preparation and Evaluation of Chitosan/Carrageenan Beads for Controlled Release of Sodium Diclofenac", AAPS PharmSciTech, 2007, 8(4), 20-130.
Prasad, et al., "Hydrogen Storage in Double Clathrates with tert-Butylamine", The Journal of Physical Chemistry A, Letters, 2009, 113(24), 6540-6543.
Prasad, et al., "Weak gel of chitin with ionic liquid, 1-allyl-3-methylimidazolium bromide", Int. J. Biol. Macromol., 45:221-225 (2009).
Pu, et al., "Ionic liquid as a green solvent for lignin", J. Wood Chem. Technol, 27:23-33 (2007).
Qin, et al., "Dissolution or extraction of crustacean shells using ionic liquids to obtain high molecular weight purified chitin and direct production of chitin films and fibers", Green Chem., 12:968-971 (2010).
Rathinamoorthy, et al., "Polysaccharide Fibers in Wound Management", International Journal of Pharmacy and Pharmaceutical Sciences, 2011, 3(3), 38-44.

(56) References Cited

OTHER PUBLICATIONS

Remsing, et al., "Mechanism of cellulose dissolution in the ionic liquid 1-n-butyl-3-methylimidazolium chloride: a13C and 35/37Cl NMR relaxation study on model systems", Chem. Commun., pp. 1271-1273 (2006).
Ren, et al., "Synthesis of 1-Allyl-3-Methylimidazolium-Based Room Temperature Ionic Liquid and Preliminary Study of its Dissolving Cellulose", Acta Polymerica Sinica, 3:448-451 (2003) (abstract).
Rinaudo, et al., "Chitin and chitosan: Properties and application", Polym. Sci. 2006, 3, 603-632.
Rødde, et al., "A Seasonal Study of the Chemical Composition and Chitin Quality of Shrimp Shells obtained from Northern Shrimp (*Pandalus borealis*)", Carbohydrate Polymers, 71:388-393 (2008).
Rodrigues, et al., "Biocompatibility of Chitosan Carriers with Application in Drug Delivery", Journal of Functional Biomaterials, 2012, 3, 615-641.
Rogers, et al., "Ionic Liquids—Solvents of the Future?" Science, 302:792-793 (2003).
Rutherford, et al., "Proceedings of the first international conference on chitin/chitosan", ed. Muzzarelli and Pariser, 1978, 182-192.
Sakai, "Determination of Pore Size and Pore Size Distribution", J. Membr. Sci., 96:91-130 (1994).
Sashiwa, et al., "Chemical modification of chitin and chitosan 2: preparation and water soluble property of N-acylated or N-alkylated partially deacetylated chitins", Carbohydrate Polymers, 1999, 39, 127-138.
Scurto, et al., "Carbon dioxide induced separation of ionic liquids and water", Chem. Commun., 572-573 (2003).
Shahidi, et al., "Chitin, Chitosan, and Co-Products: Chemistr, Production, Applications, and Health Effects," Adv. Food Nutr. Res. 2005, 49, 93-135.
Shamshina, et al., "Chitin-Alginate Fibers Spun from Ionic Liquid Solution as Novel Wound Care Composites", J. Mater. Chem. B 2014, 2, 3924-3936.
Shen, "Comparison of hydrogels prepared with ionic-liquid-isolated vs. commercial chitin and cellulose", ACS Sustainable Chem. Eng. 2016, 4(2), 471-480.
Shen, et al., "Enhanced Performance of a Novel Polyviyl Amine/Chitosan/Graphene Oxide Mixed Matrix Membrane for CO2 Capture", ACS Sustainable Chem. Eng. 2015, 3(8), 1819-1829.
Shigemasa, et al., "Chemical modification of chitin and chitosan 1: preparation of partially deacetylated chitin derivatives via a ring-opening reaction with cyclic acid anhydrides in lithium chloride/N,N-dimethylacetamide", Carbohydr. Polym. 39:237-243 (1999).
Shriver, et al., Inorganic Chemistry, W. H. Freeman & Co., New York, pp. 405-407 (1990).
Snedden, et al., "Cross-Linked Polymer-Ionic Liquid Composite Materials", Macromolecules, 36(12):4549-4556 (2003).
Stepnowski, "Solid-phase extraction of room-temperature imidazolium ionic liquids from aqueous environmental samples", Anal. Bioanal. Chem., 381:189-193 (2005).
Stöllner, et al., "Activation of Cellulose Membranes with 1,1'-Carbonyldiimidazole or 1-Cyano-4-Dimethylaminopyridinium Tetrafluoroborate as a Basis for the Development of Immunosensors", Anal. Biochem. 304:157-165 (2002).
Strauss, "Invited Review. A combinatorial approach to the development of environmentally benign organic chemical preparations", Aust. J. Chem., 52:83-96 (1999).
Suarez, et al., "Synthesis and Physical-Chemical Properties of Ionic Liquids Based on 1-n-Butyl-3-Methylimidazolium Cation", J. Chim. Phys., 95:1626-1639 (1998).
Sukhanova, et al., Vysokomol. Soedin. Ser. B 31 (1989) 381; Chem. Abstr. 111(20):175985n.
Sun, et al., "Complete dissolution and partial delignification of wood in the ionic liquid 1-ethyl-3-methylimidazolium acetate", Green Chem., 11:646-655 (2009).
Sun, et al., "Magnetite-embedded cellulose fibers prepared from ionic liquids", J. Mater. Chem., 18:283-290 (2008).
Swatloski, et al., "Dissolution of Cellulose with Ionic Liquids", J. Am. Chem. Soc., 124:4974-4975 (2002).
Swatloski, et al., "Ionic Liquids for the Dissolution and Regeneration of Cellulose, in Molten Salts XIII: Proceedings of the International Symposium", Trulove, P.C., DeLong, H.C., Mantz, R.A., Stafford, G.R., Matsunaga, M., Eds., The Electrochemical Society: Pennington, NJ, 19:155-164 (2002).
Synowiecki, et al., "Production, Properties, and Some New Applications of Chitin and Its Derivatives", Crit. Rev. Food Sci. Nutr., 43(2):145-171 (2003).
Taepaiboon, et al., "Vitamin-loaded electrospun cellulose acetate nanofiber mats as transdermal and dermal therapeutic agents of vitamin A and vitamin E", European Journal of Biopharmacology, 2007, 67(2), 387-397.
Tiller, et al., "A Novel Efficient Enzyme-Immobilization Reaction on NH2 Polymers by Means of L-Ascorbic Acid", Biotechnol. Appl. Biochem., 30:155-162 (1999).
Tokura, et al., "Studies on Chitin. III. Preparation of Chitin Fibers", Polym. J., 11(10):781-786 (1979).
Turner, "Immobilization of Biocatalysts Using Novel IL-Reconstituted Cellulosic Support Materials", presentation on Apr. 19, 2005.
Turner, et al., "Ionic Liquid-Reconstituted Cellulose Composites as Solid Support Matrices for Biocatalyst Immobilization", Biomacromolecules, 2005, 6, 2497-2502.
Turner, et al., "Production of Bioactive Cellulose Films Reconstituted from Ionic Liquids", Biomacromolecules, 5:1379-1384 (2004).
Tuzlakoglu, et al., "Production and Characterization of Chitosan Fibers and 3-D Fiber Mesh Scaffolds for Tissue Engineering Applications", Micromolecular Bioscience, 2004, 4, 811-819.
Valdez-Peña, et al., "Screening of Industrial Enzymes for Deproteinization of Shrimp Head for Chitin Recovery," Food Sci. Biotechnol. 2010, 19, 553-557.
Ventura, et al., "Evaluation of Anion Influence on the Formation and Extraction Capacity of Ionic-Liquid-Based Aqueous Biphasic Systems," J. Phys. Chem. B 2009, 113, 9304-9310.
Vijayaraghavan, et al., "An Assessment on the Interaction of a Hydrophilic Ionic Liquid with Different Sorbents", Ind. Eng. Chem. Res., 48:7283-7288 (2009).
Visser, et al., "Task Specific Ionic Liquids for the Extraction of Metal Ions from Aqueous Solutions", Chem. Commun., 135-136 (2001).
Wang, et al., "Chitosan-Alginate PEC Membrane as a Wound Dressing: Assessment of Incisional Wound Healing", Journal of Biomedical Materials Research, 2002, 63(5), 601-618.
Wasserscheid, et al., "Ionic Liquids—New "Solutions" for Transition Metal catalysis", Angew Chem Int Ed Engl, 2000, 39:3772.
Weckstrom, et al., "Entrapment of Whole Cell Yeast β-Galactosidase in Precipated Cellulose Derivatives", Food Process Eng., vol. 2, Applied Science Publishers Ltd., pp. 148-151 (1979).
Welton, "Room-Temperature Ionic Liquids", Solvents for Synthesis and Catalysis. Chem Rev., 99:2071-2083, 1999.
White, et al., "Naturally inspired nitrogen doped porous carbon," J. Mater. Chem. 2009, 19, 8645-8650.
Wilkes, et al., "Air and Water Stable 1-Ethyl-3-methylimidazolium Based Ionic Liquids", J. Chem. Soc. Chem. Commun., 13:965-967 (1992).
Willauer, et al., "Investigation of aqueous biphasic systems for the separation of lignins from cellulose in paper pulping process", J. Chromatogr. B: Biomed. Sci. Applic., 743(1-2):127-135 (2000).
Wu, et al., "A novel biomass-ionic liquid platform for the utilization of native chitin", Polymer, 49:2321-2327 (2008).
Wu, et al., "Do we understand the recyclability of ionic liquids?" Chem. Eur. J., 15:1804-1810 (2009).
Wu, et al., "Homogeneous Acetylation of Cellulose in a New Ionic Liquid", Biomacromol. 5:266-268 (2004).
Xie, et al., "Chitin and chitosan dissolved in ionic liquids as reversible sorbents of CO2", Green Chem., 8:630-633 (2006).
Yamazaki, et al., "An acidic cellulose-chitin hybrid gel as novel electrolyte for an electric double layer capacitor", Electrochem. Commun. 11:68-70, 2009.
Younes, et al., "Chitin and Chitosan Preparation from Marine Sources. Structure, Properties and Applications," Mar. Drugs 2015, 13, 1133-1174.

(56) References Cited

OTHER PUBLICATIONS

Younes, et al., "Chitin and chitosan preparation from shrimp shells using optimized enzymatic deproteinization," Process Biochem. 2012, 47, 2032-2039.

Yusof, et al., "Flexible chitin films as potential wound-dressing materials: Wound model studies", J Biomed Mater Res A, 2003, 66, 224.

Zafarani-Moattar, et al., "Salting-Out Effect, Preferential Exclusion, and Phase Separation in Aqueous Solutions of Chaotrophic Water-Miscible Ionic Liquids and Kosmotropic Salts: Effects of Temperature, Anions, and Cations," Journal of Chemical & Engineering Data 2010, 55, 1598-1610.

Zafarani-Moattar, et al., "A New Aqueous Biphasic System Containing Polypropylene Glycol and a Water-Miscible Ionic Liquid," Biotechnol. Progr. 2012, 28, 146-156.

Zaman, et al., "Physico-medical properties of wound dressing material and its biomedical application", Journal of the Mechanical Behavior of Biomedical Materials, 2011, 4(7), 1369-1375.

Zhang, et al., "Preparation and Properties of Bacterial Cellulose/Alginate Blend Bio-Fibers", Journal of Engineered Fibers and Fabrics, 2011, 6(3), 69-72.

Zhang, et al., "Preparation of Cellulose/Chitin Blend Bio-Fibers via Direct Dissolution", Cellulose Chemistry and Technology, 2009, 43, 393-398.

\* cited by examiner

COAGULATION OF CHITIN FROM IONIC LIQUID SOLUTIONS USING KOSMOTROPIC SALTS

CROSS-REFERENCE TO RELATED APPLICATIONS

This application claims the benefit of priority to U.S. Provisional Application No. 62/443,019, filed Jan. 6, 2017, which is hereby incorporated herein by reference in its entirety.

BACKGROUND

Chitin, a naturally occurring linear polymer of N-acetylglucosamine, is composed of β(1→4) linked 2-acetamido-2-deoxy-β-D-glucose sugar elements (White R J et al. *J. Mater. Chem.* 2009, 19, 8645-8650). Chitin is a biocompatible, antimicrobial, and biodegradable polymer that has been utilized for a range of high-end to low-end applications. Additionally, chitin, which can be found as the structural support in the outer skeleton of arthropods and in the cell wall of fungi, is the second-most abundant naturally occurring polymer in the world (Bartlett et al., *Science*, 310:1775-1777, 2005). Yet, the current industrial chitin-extraction process is energy-intensive and is based on using hydrochloric acid (HCl) at different concentrations (up to 10% w/v) for 1-3 h at room temperature for a "demineralization" step, followed by treatment with sodium hydroxide (NaOH) at temperatures up to 160° C. for a few days for "deproteinization." Production of 1 kg of chitin using this method requires 6.3 kg of HCl, 1.8 kg of NaOH, and as much as 1.4 tons of water at elevated temperatures of 100° C. for at least 72 h (Shahidi F and Abuzaytoun R. *Adv. Food Nutr. Res.* 2005, 49, 93-135). The use of harsh acid and caustic causes some depolymerization of the product and affects the inherent properties of the chitin, decreasing its molecular weight and increasing degree of acetylation (% DA).

Recently, there has been an upsurge of interest towards extracting chitin from biorenewable resources using ionic liquids (ILs) (Qin Y et al. *Green Chem.* 2010, 12, 968-971; Barber P S et al. *Green Chem.* 2014, 16, 1828-1836; Shamshina J et al. *J. Mater. Chem. B* 2014, 2, 3924-3936). This method is capable of extracting high molecular weight (MW) chitin, which is the only type of chitin suitable for various applications involving fibers, films, gels, and electro-spun mats (Shamshina J et al. *J. Mater. Chem. B* 2014, 2, 3924-3936; Barber P S et al. *Pure Appl. Chem.* 2013, 85, 1693-1701; Cho Y I et al. *J. Agric. Food. Chem.* 1998, 46, 3839-3843; Barber P S et al. *Green Chem.* 2013, 15, 601-607). Despite the recent success towards extracting chitin using ionic liquids, the extensive use of this method has been limited primarily due to the high cost of the ionic liquid itself and the need for effective means of recovery and recycling of the ionic liquid since, in order to isolate the extracted chitin, addition of anti-solvent (water) to the ionic liquid is needed. While the technology itself is promising, the cost associated with it could restrict wide acceptance of commercial deployment without the ionic liquid recycling. It is therefore imperative to develop affordable and robust separation technologies that can recover ionic liquid from aqueous solutions while minimizing any ionic liquid losses in the recovery process. The methods described herein address these and other needs.

SUMMARY

In accordance with the purposes of the disclosed systems and methods, as embodied and broadly described herein, the disclosed subject matter relates to compositions and to methods of isolating chitin from chitinous biomass. The disclosed subject matter can also relate to method of recycling ionic liquids. In particular examples, disclosed herein are methods for coagulating chitin from ionic liquid solutions using kosmotropic salts. In other examples, disclosed herein are methods for recycling ionic liquid—water solutions using kosmotropic salts.

Additional advantages of the disclosed process will be set forth in part in the description which follows, and in part will be obvious from the description, or can be learned by practice of the disclosed process. The advantages of the disclosed process will be realized and attained by means of the elements and combinations particularly pointed out in the appended claims. It is to be understood that both the foregoing general description and the following detailed description are exemplary and explanatory only and are not restrictive of the disclosed process, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The patent or application file contains at least one drawing executed in color. Copies of the patent or patent application publication with color drawing(s) will be provided by the Office upon request and payment of the necessary fee.

The accompanying figures, which are incorporated in and constitute a part of this specification illustrate several aspects described below.

DETAILED DESCRIPTION

Figure 1:
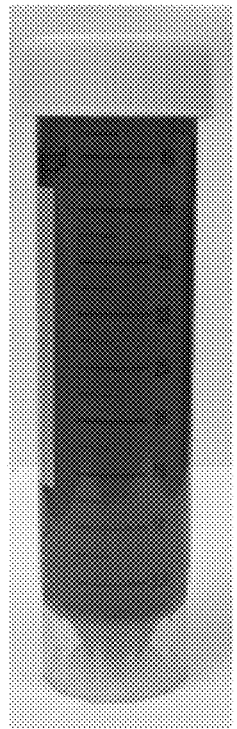
FIG. 1 is a photograph of an ionic liquid solution ([C$_2$mim][OAc]) containing chitin.

The materials, compounds, compositions, articles, and methods described herein can be understood more readily by reference to the following detailed description of specific aspects of the disclosed subject matter and the Examples and Figures included therein.

Before the present materials, compounds, compositions, articles, devices, and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

General Definitions

In this specification and in the claims that follow, reference will be made to a number of terms, which shall be defined to have the following meanings:

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an ionic liquid" includes mixtures of two or more such ionic liquids, reference to "the compound" includes mixtures of two or more such compounds, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed, then "less than or equal to" the value, "greater than or equal to the value," and possible ranges between values are also disclosed, as appropriately understood by the skilled artisan. For example, if the value "10" is disclosed, then "less than or equal to 10" as well as "greater than or equal to 10" is also disclosed. It is also understood that throughout the application data are provided in a number of different formats and that this data represent endpoints and starting points and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Chemical Definitions

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

The term "ion," as used herein, refers to any molecule, portion of a molecule, cluster of molecules, molecular complex, moiety, or atom that contains a charge (positive, negative, or both at the same time within one molecule, cluster of molecules, molecular complex, or moiety (e.g., Zwitterions)) or that can be made to contain a charge. Methods for producing a charge in a molecule, portion of a molecule, cluster of molecules, molecular complex, moiety, or atom are disclosed herein and can be accomplished by methods known in the art, e.g., protonation, deprotonation, oxidation, reduction, alkylation acetylation, esterification, deesterification, hydrolysis, etc.

The term "anion" is a type of ion and is included within the meaning of the term "ion." An "anion" is any molecule, portion of a molecule (e.g., Zwitterion), cluster of molecules, molecular complex, moiety, or atom that contains a net negative charge or that can be made to contain a net negative charge. The term "anion precursor" is used herein to specifically refer to a molecule that can be converted to an anion via a chemical reaction (e.g., deprotonation).

The term "cation" is a type of ion and is included within the meaning of the term "ion." A "cation" is any molecule, portion of a molecule (e.g., Zwitterion), cluster of molecules, molecular complex, moiety, or atom, that contains a net positive charge or that can be made to contain a net positive charge. The term "cation precursor" is used herein to specifically refer to a molecule that can be converted to a cation via a chemical reaction (e.g., protonation or alkylation).

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valencies of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc.

"$Z^1$," "$Z^2$," "$Z^3$," and "$Z^4$" are used herein as generic symbols to represent various specific substituents. These symbols can be any substituent, not limited to those disclosed herein, and when they are defined to be certain substituents in one instance, they can, in another instance, be defined as some other substituents.

The term "aliphatic" as used herein refers to a non-aromatic hydrocarbon group and includes branched and unbranched, alkyl, alkenyl, or alkynyl groups.

As used herein, the term "alkyl" refers to saturated, straight-chained or branched saturated hydrocarbon moieties. Unless otherwise specified, $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl groups are intended. Examples of alkyl groups include methyl, ethyl, propyl, 1-methyl-ethyl, butyl, 1-methyl-propyl, 2-methyl-propyl, 1,1-dimethyl-ethyl, pentyl, 1-methyl-butyl, 2-methyl-butyl, 3-methyl-butyl, 2,2-dimethyl-propyl, 1-ethyl-propyl, hexyl, 1,1-dimethyl-propyl, 1,2-dimethyl-propyl, 1-methyl-pentyl, 2-methyl-pentyl, 3-methyl-pentyl, 4-methyl-pentyl, 1,1-dimethyl-butyl, 1,2-dimethyl-butyl, 1,3-dimethyl-butyl, 2,2-dimethyl-butyl, 2,3-dimethyl-butyl, 3,3-dimethyl-butyl, 1-ethyl-butyl, 2-ethyl-butyl, 1,1,2-trimethyl-propyl, 1,2,2-trimethyl-propyl, 1-ethyl-1-methyl-propyl, 1-ethyl-2-methyl-propyl, heptyl, octyl, nonyl, decyl, dodecyl, tetradecyl, hexadecyl, eicosyl, tetracosyl, and the like. Alkyl substituents may be unsubstituted or substituted with one or more chemical moieties. The alkyl group can be substituted with one or more groups including, but not limited to, hydroxyl, halogen, acyl, alkyl, alkoxy, alkenyl, alkynyl, aryl, heteroaryl, aldehyde, amino, cyano, carboxylic acid, ester, ether, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" specifically refers to an alkyl group that is substituted with one or more halides (halogens; e.g., fluorine, chlorine, bromine, or iodine). The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

As used herein, the term "alkenyl" refers to unsaturated, straight-chained, or branched hydrocarbon moieties containing a double bond. Unless otherwise specified, $C_2$-$C_{24}$ (e.g., $C_2$-$C_{22}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkenyl groups are intended. Alkenyl groups may contain more than one unsaturated bond. Examples include ethenyl, 1-propenyl, 2-propenyl, 1-methylethenyl, 1-butenyl, 2-butenyl, 3-butenyl, 1-methyl-1-propenyl, 2-methyl-1-propenyl, 1-methyl-2-propenyl, 2-methyl-2-propenyl, 1-pentenyl, 2-pentenyl, 3-pentenyl, 4-pentenyl, 1-methyl-1-butenyl, 2-methyl-1-butenyl, 3-methyl-1-butenyl, 1-methyl-2-butenyl, 2-methyl-2-butenyl, 3-methyl-2-butenyl, 1-methyl-3-butenyl, 2-methyl-3-butenyl, 3-methyl-3-butenyl, 1,1-dimethyl-2-propenyl, 1,2-dimethyl-1-propenyl, 1,2-dimethyl-2-propenyl, 1-ethyl-1-propenyl, 1-ethyl-2-propenyl, 1-hexenyl, 2-hexenyl, 3-hexenyl, 4-hexenyl, 5-hexenyl, 1-methyl-1-pentenyl, 2-methyl-1-pentenyl, 3-methyl-1-pentenyl, 4-methyl-1-pentenyl, 1-methyl-2-pentenyl, 2-methyl-2-pentenyl, 3-methyl-2-pentenyl, 4-methyl-2-pentenyl, 1-methyl-3-pentenyl, 2-methyl-3-pentenyl, 3-methyl-3-pentenyl, 4-methyl-3-pentenyl, 1-methyl-4-pentenyl, 2-methyl-4-pentenyl, 3-methyl-4-pentenyl, 4-methyl-4-pentenyl, 1,1-dimethyl-2-butenyl, 1,1-dimethyl-3-butenyl, 1,2-dimethyl-1-butenyl, 1,2-dimethyl-2-butenyl, 1,2-dimethyl-3-butenyl, 1,3-dimethyl-1- butenyl, 1,3-dimethyl-2-butenyl, 1,3-dimethyl-3-butenyl, 2,2-dimethyl-3-butenyl, 2,3-dimethyl-1-butenyl, 2,3-diethyl-2-butenyl, 2,3-dimethyl-3-butenyl, 3,3-dimethyl-1-butenyl, 3,3-dimethyl-2-butenyl, 1-ethyl-1-butenyl, 1-ethyl-2-butenyl, 1-ethyl-3-butenyl, 2-ethyl-1-butenyl, 2-ethyl-2-butenyl, 2-ethyl-3-butenyl, 1,1,2-trimethyl-2-propenyl, 1-ethyl-1-methyl-2-propenyl, 1-ethyl-2-methyl-1-propenyl, and 1-ethyl-2-methyl-2-propenyl. The term "vinyl" refers to a group having the structure —CH═CH$_2$; 1-propenyl refers to a group with the structure -CH═CH—CH$_3$; and 2-propenyl refers to a group with the structure —CH$_2$—CH═CH$_2$. Asymmetric structures such as $(Z^1Z^2)C═C(Z^3Z^4)$ are intended to include both the E and Z isomers. This can be presumed in structural formulae herein wherein an asymmetric alkene is present, or it can be explicitly indicated by the bond symbol C═C. Alkenyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below, provided that the substituents are sterically compatible and the rules of chemical bonding and strain energy are satisfied.

As used herein, the term "alkynyl" represents straight-chained or branched hydrocarbon moieties containing a triple bond. Unless otherwise specified, $C_2$-$C_{24}$ (e.g., $C_2$-$C_{24}$, $C_2$-$C_{20}$, $C_2$-$C_{18}$, $C_2$-$C_{16}$, $C_2$-$C_{14}$, $C_2$-$C_{12}$, $C_2$-$C_{10}$, $C_2$-$C_8$, $C_2$-$C_6$, or $C_2$-$C_4$) alkynyl groups are intended. Alkynyl groups may contain more than one unsaturated bond. Examples include $C_2$-$C_6$-alkynyl, such as ethynyl, 1-propynyl, 2-propynyl (or propargyl), 1-butynyl, 2-butynyl, 3-butynyl, 1-methyl-2-propynyl, 1-pentynyl, 2-pentynyl, 3-pentynyl, 4-pentynyl, 3-methyl-1-butynyl, 1-methyl-2-butynyl, 1-methyl-3-butynyl, 2-methyl-3-butynyl, 1,1-dimethyl-2-propynyl, 1-ethyl-2-propynyl, 1-hexynyl, 2-hexynyl, 3-hexynyl, 4-hexynyl, 5-hexynyl, 3-methyl-1-pentynyl, 4-methyl-1-pentynyl, 1-methyl-2-pentynyl, 4-methyl-2-pentynyl, 1-methyl-3-pentynyl, 2-methyl-3-pentynyl, 1-methyl-4-pentynyl, 2-methyl-4-pentynyl, 3-methyl-4-pentynyl, 1,1-dimethyl-2-butynyl, 1,1-dimethyl-3-butynyl, 1,2-dimethyl-3-butynyl, 2,2-dimethyl-3-butynyl, 3,3-dimethyl-1-butynyl, 1-ethyl-2-butynyl, 1-ethyl-3-butynyl, 2-ethyl-3-butynyl, and 1-ethyl-1-methyl-2-propynyl. Alkynyl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol, as described below.

As used herein, the term "aryl," as well as derivative terms such as aryloxy, refers to groups that include a monovalent aromatic carbocyclic group of from 3 to 50 carbon atoms. Aryl groups can include a single ring or multiple condensed rings. In some embodiments, aryl groups include $C_6$-$C_{10}$ aryl groups. Examples of aryl groups include, but are not limited to, benzene, phenyl, biphenyl, naphthyl, tetrahydronaphtyl, phenylcyclopropyl, phenoxybenzene, and indanyl. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. The term "non-heteroaryl," which is also included in the term "aryl," defines a group that contains an aromatic group that does not contain a heteroatom. The aryl substituents may be unsubstituted or substituted with one or more chemical moieties. Examples of suitable substituents include, for example, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein. The term "biaryl" is a specific type of aryl group and is included in the definition of aryl. Biaryl refers to two aryl groups that are bound together via a fused ring structure, as in naphthalene, or are attached via one or more carbon-carbon bonds, as in biphenyl.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, etc. The term "heterocycloalkyl" is a cycloalkyl group as defined above where at least one of the carbon atoms of the ring is substituted with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cycloalkenyl" as used herein is a non-aromatic carbon-based ring composed of at least three carbon atoms and containing at least one double bound, i.e., C═C. Examples of cycloalkenyl groups include, but are not limited to, cyclopropenyl, cyclobutenyl, cyclopentenyl, cyclopentadienyl, cyclohexenyl, cyclohexadienyl, and the like. The term "heterocycloalkenyl" is a type of cycloalkenyl group as defined above, and is included within the meaning of the term "cycloalkenyl," where at least one of the carbon atoms of the ring is substituted with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, alkoxy, alkenyl, alkynyl, aryl, heteroaryl, acyl, aldehyde, amino, cyano, carboxylic acid, ester, ether, halide, hydroxyl, ketone, nitro, phosphonyl, silyl, sulfo-oxo, sulfonyl, sulfone, sulfoxide, or thiol as described herein.

The term "cyclic group" is used herein to refer to either aryl groups, non-aryl groups (i.e., cycloalkyl, heterocycloalkyl, cycloalkenyl, and heterocycloalkenyl groups), or both. Cyclic groups have one or more ring systems that can be substituted or unsubstituted. A cyclic group can contain one or more aryl groups, one or more non-aryl groups, or one or more aryl groups and one or more non-aryl groups.

The term "acyl" as used herein is represented by the formula —C(O)Z$^1$ where Z$^1$ can be a hydrogen, hydroxyl, alkoxy, alkyl, alkenyl, alkynyl, aryl, heteroaryl, cycloalkyl, cycloalkenyl, heterocycloalkyl, or heterocycloalkenyl group described above. As used herein, the term "acyl" can be used interchangeably with "carbonyl." Throughout this specification "C(O)" or "CO" is a short hand notation for C═O.

The term "acetal" as used herein is represented by the formula $(Z^1Z^2)C(═OZ^3)(═OZ^4)$, where Z$^1$, Z$^2$, Z$^3$, and Z$^4$ can be, independently, a hydrogen, halogen, hydroxyl, alkyl, alkenyl, alkynyl, aryl, heteroaryl, cycloalkyl, cycloalkenyl, heterocycloalkyl, or heterocycloalkenyl group described above.

As used herein, the term "alkoxy" as used herein is an alkyl group bound through a single, terminal ether linkage;

that is, an "alkoxy" group can be defined as to a group of the formula $Z^1$—O—, where $Z^1$ is unsubstituted or substituted alkyl as defined above. Unless otherwise specified, alkoxy groups wherein $Z^1$ is a $C_1$-$C_{24}$ (e.g., $C_1$-$C_{22}$, $C_1$-$C_{20}$, $C_1$-$C_{18}$, $C_1$-$C_{16}$, $C_1$-$C_{14}$, $C_1$-$C_{12}$, $C_1$-$C_{10}$, $C_1$-$C_8$, $C_1$-$C_6$, or $C_1$-$C_4$) alkyl group are intended. Examples include methoxy, ethoxy, propoxy, 1-methyl-ethoxy, butoxy, 1-methyl-propoxy, 2-methyl-propoxy, 1,1-dimethyl-ethoxy, pentoxy, 1-methyl-butyloxy, 2-methyl-butoxy, 3-methyl-butoxy, 2,2-di-methyl-propoxy, 1-ethyl-propoxy, hexoxy, 1,1-dimethyl-propoxy, 1,2-dimethyl-propoxy, 1-methyl-pentoxy, 2-methyl-pentoxy, 3-methyl-pentoxy, 4-methyl-penoxy, 1,1-dimethyl-butoxy, 1,2-dimethyl-butoxy, 1,3-dimethyl-butoxy, 2,2-dimethyl-butoxy, 2,3-dimethyl-butoxy, 3,3-dimethyl-butoxy, 1-ethyl-butoxy, 2-ethylbutoxy, 1,1,2-trimethyl-propoxy, 1,2,2-trimethyl-propoxy, 1-ethyl-1-methyl-propoxy, and 1-ethyl-2-methyl-propoxy.

The term "aldehyde" as used herein is represented by the formula —C(O)H. Throughout this specification "C(O)" is a short hand notation for C=O.

The terms "amine" or "amino" as used herein are represented by the formula —N$Z^1Z^2Z^3$, where $Z^1$, $Z^2$, and $Z^3$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The terms "amide" or "amido" as used herein are represented by the formula —C(O)N$Z^1Z^2$, where $Z^1$ and $Z^2$ can each be substitution group as described herein, such as hydrogen, an alkyl, alkenyl, alkynyl, aryl, heteroaryl, cycloalkyl, cycloalkenyl, heterocycloalkyl, or heterocycloalkenyl group described above.

The term "carboxylic acid" as used herein is represented by the formula —C(O)OH. A "carboxylate" or "carboxyl" group as used herein is represented by the formula —C(O)O$^-$.

The term "cyano" as used herein is represented by the formula —CN.

The term "ester" as used herein is represented by the formula —OC(O)$Z^1$ or —C(O)O$Z^1$, where $Z^1$ can be an alkyl, alkenyl, alkynyl, aryl, heteroaryl, cycloalkyl, cycloalkenyl, heterocycloalkyl, or heterocycloalkenyl group described above.

The term "ether" as used herein is represented by the formula $Z^1$O$Z^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "ketone" as used herein is represented by the formula $Z^1$C(O)$Z^2$, where $Z^1$ and $Z^2$ can be, independently, an alkyl, alkenyl, alkynyl, aryl, heteroaryl, cycloalkyl, cycloalkenyl, heterocycloalkyl, or heterocycloalkenyl group described above.

The term "halide" or "halogen" or "halo" as used herein refers to fluorine, chlorine, bromine, and iodine.

The term "hydroxyl" as used herein is represented by the formula —OH.

The term "nitro" as used herein is represented by the formula —NO$_2$.

The term "phosphonyl" is used herein to refer to the phospho-oxo group represented by the formula —P(O)(O$Z^1$)$_2$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "silyl" as used herein is represented by the formula —Si$Z^1Z^2Z^3$, where $Z^1$, $Z^2$, and $Z^3$ can be, independently, hydrogen, alkyl, alkoxy, alkenyl, alkynyl, aryl, heteroaryl, cycloalkyl, cycloalkenyl, heterocycloalkyl, or heterocycloalkenyl group described above.

The term "sulfonyl" or "sulfone" is used herein to refer to the sulfo-oxo group represented by the formula —S(O)$_2Z^1$, where $Z^1$ can be hydrogen, an alkyl, alkenyl, alkynyl, aryl, heteroaryl, cycloalkyl, cycloalkenyl, heterocycloalkyl, or heterocycloalkenyl group described above.

The term "sulfide" as used herein is comprises the formula —S—.

The term "thiol" as used herein is represented by the formula —SH.

"$R^1$," "$R^2$," "$R^3$," "$R^n$," etc., where n is some integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an amine group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

Unless stated to the contrary, a formula with chemical bonds shown only as solid lines and not as wedges or dashed lines contemplates each possible stereoisomer or mixture of stereoisomer (e.g., each enantiomer, each diastereomer, each meso compound, a racemic mixture, or scalemic mixture).

The term "hydrogen bond" describes an attractive interaction between a hydrogen atom from a molecule or molecular fragment X—H in which X is more electronegative than H, and an atom or a group of atoms in the same or different molecule, in which there is evidence of bond formation. The hydrogen bond donor can be a cation and the hydrogen bond acceptor can be an anion.

The term "complex" describes a coordination complex, which is a structure comprised of a central atom or molecule that is weakly connected to one or more surrounding atoms or molecules, or describes chelate complex, which is a coordination complex with more than one bond.

References to "mim," "$C_n$-mim," and "bmim" are intended to refer to a methyl imidazolium compound, an alkyl (with n carbon atoms) methyl imidazolium compound, and a butyl methylimidazolium compound respectively.

As used herein, the term "chitinous biomass" means any source of chitin or chitosan that is derived from an arthropod (e.g., the exoskeleton of an arthropod, such as the exoskeleton on an insect or a marine exoskeleton, such as the shells of crustaceans like shrimp, crab, lobster, crawfish, prawns, etc.) or fungi.

As used herein, the term "chitosan" means deacetylated chitin (at least 50% deacetylated) or any other form of chemically modified chitin.

Reference will now be made in detail to specific aspects of the disclosed materials, compounds, compositions, formulations, articles, and methods, examples of which are illustrated in the accompanying Examples and Figures.

Methods

Disclosed herein are methods for separating chitin from a source of chitin such as a chitinous biomass. Also disclosed herein are methods of recycling ionic liquids. In specific examples, the disclosed process relates to dissolving or dispersing a source of chitin such as a chitinous biomass.

Chitin is an N-acetyl-D-glucosamine polymer that has a similar structure to cellulose. It is the most abundant polymer in the marine environment. Chitin is the main component of the exoskeletons of arthropods, such as crustaceans and in the cell walls of fungi. It has been a major source of surface pollution in coastal areas. Both chitin and its major derivative chitosan (obtained by deacetylation of chitin) have numerous applications. The bioactivity, biocompatibility, and low toxicity of native or chemically-modified chitin and chitosan make them suitable for controlled drug release, cosmetics, food preservation, fertilizer, or biodegradable packaging materials, or waste water processing and other industrial applications. Chitin, however, is highly hydrophobic and is insoluble in water and most organic solvents due to the high density of hydrogen bonds of the adjacent chains in solid state. The difficulty in the dissolution restricts the use of chitin as a replacement for synthetic polymers.

Crustacean shells are currently the major source of chitin available for industrial processing. The best characterized sources of chitin are shellfish (including shrimp, crab, lobster, and krill), oyster, and squids. Annual synthesis of chitin in freshwater and marine ecosystem is about 600 and 1600 million tons, respectively. Producing chitin in industry is primarily from the exoskeletons of marine crustacean shell waste by a chemical method that involves acid demineralization, alkali deproteinization, followed by decolorization. Even though the current industrialized chemical process isolates chitin from crustacean shells efficiently, disadvantages exist in these procedures, including the use of corrosive acids, bases, and strong oxidants which are not environmentally friendly. In addition, these processes can modify or nullify the desired physiochemical properties of chitin, for example, by acid demineralization, shorting the chitin chain length, as well as, degrading the chitin during deproteinization in hot alkali solutions. These undesired changes in the properties of chitin can have a profound affect when the chitin obtained therefrom must have specific molecular weight distributions and degrees of acetylation (DA).

The disclosed methods can also extract chitin from a variety of other sources. The source of chitin can be chitinous biomass, pure chitin, technical or practical grade chitin, ground or pulverized exoskeleton of arthropods, i.e., crustaceans.

The term "biomass," as used herein, refers to living or dead biological material that can be used in one or more of the disclosed methods. In the disclosed methods the "biomass" can comprise any chitinous biomass and can include materials comprising chitin, chitosan, their mixtures, and breakdown products (e.g., metabolites). Biomass can also comprise additional components, such as protein and/or lipid. Biomass can be derived from a single source, or biomass can comprise a mixture derived from more than one source.

The chitinous biomass can, in some examples, comprise an arthropod biomass, a fungi biomass, or a combination thereof. An arthropod biomass can, for example, comprise the exoskeleton of an arthropod chosen from shrimp, prawn, crayfish, crab, lobster, insect, and combinations thereof. In some examples, the chitinous biomass can contain chitin and non-chitin material.

In some examples, the source of chitin is pure chitin, for example, pure chitin obtained from crab shells, C9752, available from Sigma, St. Louis, Mo. In other examples, the source of chitin is practical grade chitin obtained from crab shells, C7170, available from Sigma, St. Louis, Mo. In further examples, the source of chitin is chitinous biomass, such as shrimp shells that are removed from the meat by peeling and processed to insure all shrimp meat is removed. However, any biomass comprising chitin or mixtures of chitin and chitosan, or mixtures of chitin, chitosan, and other polysaccharides can be used as the source of chitin.

When contemplating the biomass or source of chitin, the formulator can take into consideration the amount of chitin that comprises the biomass or source of chitin. For example, "pure chitin" can comprise from about 75% to about 85% by weight of chitin. "Technical grade" or "practical grade" chitin can comprise from about 70% to about 80% by weight of chitin. As it relates to crude biomass sources, one example of shrimps skins or shells comprises 27.2% chitin by weight, while, one example of crab shells comprises 23.9% chitin by weight.

Chitin derived from crustaceans is available from suppliers as "pure chitin" and as "practical grade chitin" and can be used herein. These forms of chitin undergo a process similar to the Kraft Process for obtaining cellulose from wood or other sources of cellulose. During the process of preparing pure chitin and practical grade chitin, there is a breakdown of the polysaccharide chains such that the resulting chitin has a shorter chain length and therefore a lower average molecular weight than it had before it was processed. Consequently, the separated chitin obtained when using the disclosed methods with these sources of chitin will likewise be of lower molecular weight than had the disclosed methods been followed with unprocessed chitinous biomass. Nonetheless, it can still be useful in various circumstances to use pure or practical grade chitin in the disclosed methods. Thus, in certain examples of the disclosed methods, the source of chitin can be pure or practical grade chitin.

One benefit of the disclosed methods, however, is that chitin can be obtained directly from chitinous biomass. As such, the disclosed methods provide a method of directly extracting chitin from a chitinous biomass without substantially shortening the polysaccharide chains. As such, the disclosed methods provides a unique method for obtaining polymeric materials comprising chitin that has the original full polysaccharide chain length (and molecular weight). Moreover the chitin can be substantially free of agents that are typically found in pure and practical grade chitin, such as methanesulfonic acid, trichloroacetic acid, dichloroacetic acid, formic acid, and dimethylacetamide. Thus, in certain examples of the disclosed methods, the source of chitin can be chitinous biomass.

Disclosed herein are methods for separating chitin from a chitinous biomass, the methods comprising: contacting the chitinous biomass with an ionic liquid to form a mixture comprising chitin. In some examples, contacting the chitinous biomass with the ionic liquid can comprise dissolving at least a portion of the chitinous biomass in the ionic liquid.

The term "ionic liquid" has many definitions in the art, but is used herein to refer to salts (i.e., an ionic compound of cations and anions) that are liquid at a temperature of at or below about 150° C. That is, at one or more temperature ranges or points at or below about 150° C. the disclosed ionic liquid compositions are liquid; although, it is understood that they can be solids at other temperature ranges or points. See e.g., Wasserscheid and Keim, *Angew Chem Int Ed Engl*, 2000, 39:3772; and Wasserscheid, "Ionic Liquids in Synthesis," 1$^{st}$ Ed., Wiley-VCH, 2002.

In some examples, the ionic liquid can be a liquid at a temperature of about 150° C. or less (e.g., about 140° C. or less, about 130° C. or less, about 120° C. or less, about 110° C. or less, about 100° C. or less, about 90° C. or less, about 80° C. or less, about 70° C. or less, about 60° C. or less, about 50° C. or less, about 40° C. or less, about 30° C. or less, about 20° C. or less, about 10° C. or less, about 0° C. or less, about −10° C. or less, about −20° C. or less, or about −30° C. or less). Further, in some examples the disclosed ionic liquids can be liquid over a range of temperatures. For example, the disclosed ionic liquids can be liquids over a range of about 1° C. or more (e.g., about 2° C. or more, about 3° C. or more, about 4° C. or more, about 5° C. or more, about 6° C. or more, about 7° C. or more, about 8° C. or more, about 9° C. or more, about 10° C. or more, about 11° C. or more, about 12° C. or more, about 13° C. or more, about 14° C. or more, about 15° C. or more, about 16° C. or more, about 17° C. or more, about 18° C. or more, about 19° C. or more, or about 20° C. or more). Such temperature ranges can begin and/or end at any of the temperature points disclosed above.

In further examples, the disclosed ionic liquids can be liquid at temperature from about −30° C. to about 150° C. (e.g., from about −20° C. to about 140° C., about −10° C. to about 130° C., from about 0° C. to about 120° C., from about 10° C. to about 110° C., from about 20° C. to about 100° C., from about 30° C. to about 90° C., from about 40° C. to about 80° C., from about 50° C. to about 70° C., from about −30° C. to about 50° C., from about −30° C. to about 90° C., from about −30° C. to about 110° C., from about −30° C. to about 130° C., from about −30° C. to about 150° C., from about 30° C. to about 90° C., from about 30° C. to about 110° C., from about 30° C. to about 130° C., from about 30° C. to about 150° C., from about 0° C. to about 100° C., from about 0° C. to about 70° C., or from about 0° to about 50° C.).

Further, exemplary properties of ionic liquids are high ionic range, non-volatility, non-flammability, high thermal stability, wide temperature for liquid phase, highly solvability, and non-coordinating. For a review of ionic liquids see, for example, Welton, Chem Rev., 99:2071-2083, 1999; and Carlin et al., Advances in Nonaqueous Chemistry, Mamantov et al. Eds., VCH Publishing, New York, 1994. These references are incorporated by reference herein in their entireties for their teachings of ionic liquids.

The term "liquid" describes the compositions that are generally in amorphous, non-crystalline, or semi-crystalline state. For example, while some structured association and packing of cations and anions can occur at the atomic level, an ionic liquid composition can have minor amounts of such ordered structures and are therefore not crystalline solids. The compositions can be fluid and free-flowing liquids or amorphous solids such as glasses or waxes at temperatures at or below 150° C.

The ionic liquids of the present disclosure can comprise an organic cation and an organic or inorganic anion. The organic cation is typically formed by alkylation of a neutral organic species capable of holding a positive charge when a suitable anion is present.

Further, the ionic liquid can be composed of at least two different ions, each of which can independently and simultaneously introduce a specific characteristic to the composition not easily obtainable with traditional dissolution and formulation techniques. Thus, by providing different ions and ion combinations, one can change the characteristics or properties of the disclosed compositions in a way not seen by simply preparing various crystalline salt forms.

Examples of characteristics that can be controlled in the disclosed compositions include, but are not limited to, melting, solubility control, rate of dissolution, and a biological activity or function. It is this multi-nature/functionality of the disclosed ionic liquid compositions which allows one to fine-tune or design in very specific desired material properties. For example, the ionic liquids of the present disclosure can comprise at least one cation and at least one anion.

The organic cation of the ionic liquids disclosed herein can comprise a linear, branched, or cyclic heteroalkyl unit. The term "heteroalkyl" refers to a cation as disclosed herein comprising one or more heteroatoms chosen from nitrogen, oxygen, sulfur, boron, or phosphorous capable of forming a cation. The heteroatom can be a part of a ring formed with one or more other heteroatoms, for example, pyridinyl, imidazolinyl rings, that can have substituted or unsubstituted linear or branched alkyl units attached thereto. In addition, the cation can be a single heteroatom wherein a sufficient number of substituted or unsubstituted linear or branched alkyl units are attached to the heteroatom such that a cation is formed. For example, the cation [$C_n$mim] where n is an integer of from 1 to 8 can be used. Preferably, ionic liquids with the cation [$C_{1-4}$mim] can be used. A particularly useful ionic liquid is 1-ethyl-3-methyl-1H-imidazol-3-ium acetate, [$C_2$mim]OAc, having the formulae:

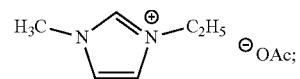

is an example of an ionic liquid comprising a cyclic heteroalkyl cation; a ring comprising 3 carbon atoms and 2 nitrogen atoms.

Other non-limiting examples of heterocyclic and heteroaryl units that can be alkylated to form cationic units include imidazole, pyrazoles, thiazoles, isothiazoles, azathiozoles, oxothiazoles, oxazines, oxazolines, oxazaboroles, dithiozoles, triazoles, selenozoles, oxahospholes, pyrroles, boroles, furans, thiphenes, phospholes, pentazoles, indoles, indolines, oxazoles, isothirazoles, tetrazoles, benzofurans, dibenzofurans, benzothiophenes, dibenzothiophenes, thiadiazoles, pyrdines, pyrimidines, pyrazines, pyridazines, piperazines, piperidines, morpholines, pyrans, annolines, phthalazines, quinazolines, and quinoxalines.

The following are examples of heterocyclic units that are suitable for forming a cyclic heteroalkyl cation unit of the disclosed ionic liquids:

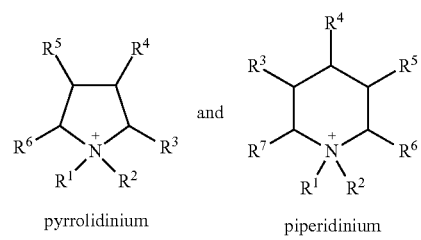

The following are further examples of heterocyclic units that are suitable for forming a cyclic heteroalkyl cation unit of the disclosed ionic liquids:

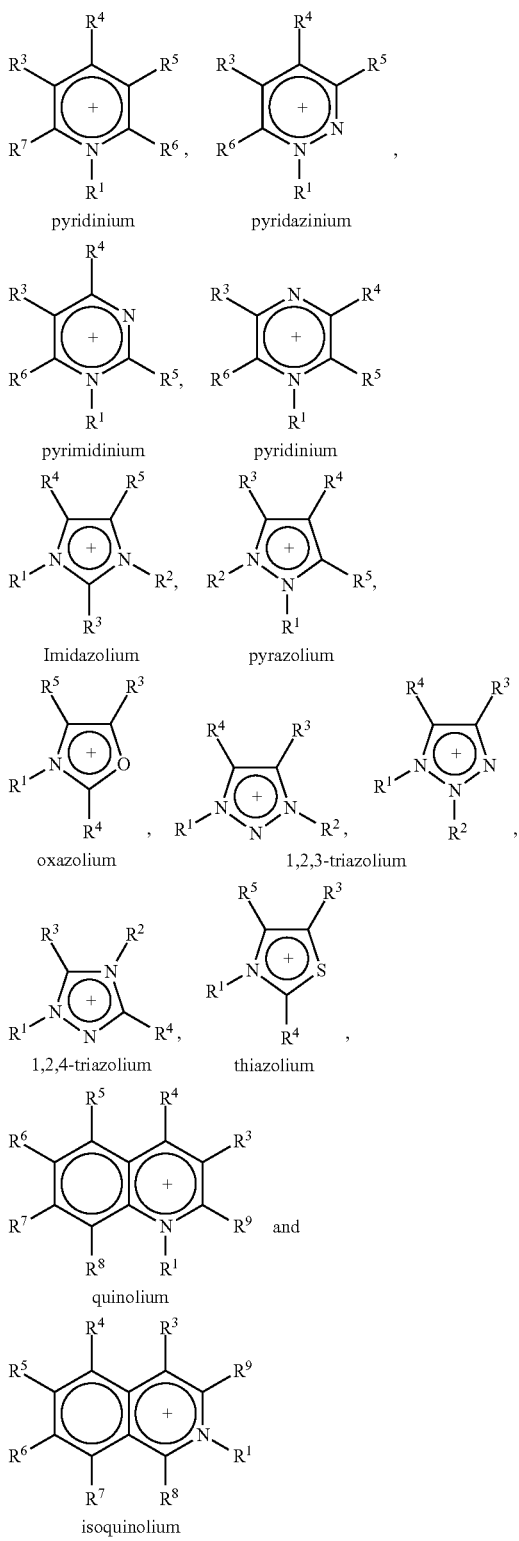

where each $R^1$ and $R^2$ is, independently, a substituted or unsubstituted linear, branched, or cyclic $C_1$-$C_6$ alkyl, or substituted or unsubstituted linear, branched, or cyclic $C_1$-$C_6$ alkoxy; each $R^3$, $R^4$, $R^5$, $R^6$, $R^7$, $R^8$, and $R^9$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl.

The following comprises yet another set of examples of heterocyclic units that are suitable for forming heterocyclic dication units of the disclosed ionic liquids and are referred to as such or as "geminal ionic liquids:" See Armstrong, D. W. et al., Structure and properties of high stability geminal dicationic ionic liquids, *J. Amer. Chem. Soc.* 2005; 127(2): 593-604; and Rogers, R. D. et al., Mercury(II) partitioning from aqueous solutions with a new, hydrophobic ethylene-glycol functionalized bis-imidazolium ionic liquid, *Green Chem.* 2003; 5:129-135 included herein by reference in its entirety.

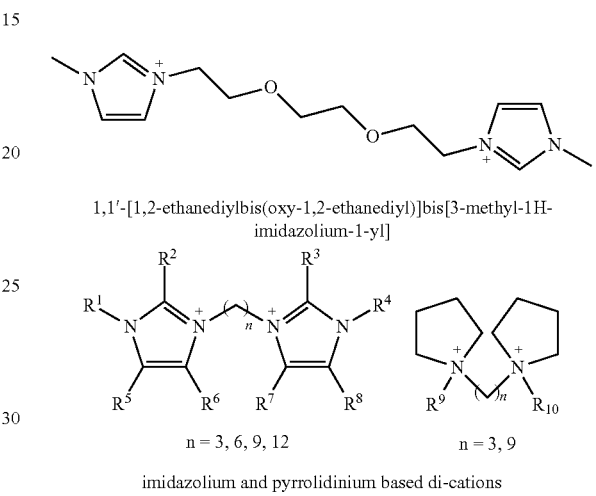

1,1'-[1,2-ethanediylbis(oxy-1,2-ethanediyl)]bis[3-methyl-1H-imidazolium-1-yl]

n = 3, 6, 9, 12         n = 3, 9 imidazolium and pyrrolidinium based di-cations where $R^1$, $R^4$, $R^9$, and $R^{10}$ comprise a substituted or unsubstituted linear, branched, or cyclic $C_1$-$C_6$ alkyl, or substituted or unsubstituted linear, branched, or cyclic $C_1$-$C_6$ alkoxy; each $R^5$, $R^6$, $R^7$, and $R^8$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl.

The choice of the anion in the ionic liquid can be particularly relevant to the rate and level of chitin dissolution. While not wishing to be bound by theory, the primary mechanism of solvation of carbohydrates by an ionic liquid is the anion's ability to break the extensive hydrogen-bonding networks by specific interactions with hydroxyl groups. Thus, it is believed that that the dissolution of chitin is enhanced by increasing the hydrogen bond acceptance and basicity of the anion. By using anions that can accept hydrogen bonds and that are relatively basic, one can not only dissolve pure chitin, but one can dissolve practical grade chitin and even extract chitin from raw chitinous biomass, as described herein. Accordingly, in some examples, the anions are substituted or unsubstituted acyl units $R^{10}CO_2$, for example, formate $HCO_2^-$, acetate $CH_3CO_2^-$ (also noted herein as [OAc]), proprionate, $CH_3CH_2CO_2^-$, butyrate $CH_3CH_2CH_2CO_2^-$, and benzylate, $C_6H_5CO_2^-$; substituted or unsubstituted sulfates: $(R^{10}O)S(=O)_2O^-$; substituted or unsubstituted sulfonates $R^{10}SO_3^-$, for example $(CF_3)SO_3^-$; substituted or unsubstituted phosphates: $(R^{10}O)_2P(=O)O^-$; and substituted or unsubstituted carboxylates: $(R^{10}O)C(=O)O^-$. Non-limiting examples of $R^{10}$ include hydrogen; substituted or unsubstituted linear branched, and cyclic alkyl; substituted or unsubstituted linear, branched, and cyclic alkoxy; substituted or unsubstituted aryl; substituted or unsubstituted aryloxy; substituted or unsubstituted heterocyclic; substituted or unsubstituted heteroaryl; acyl; silyl; boryl; phosphino; amino; thio; and seleno. In some examples, the anion is $C_{1-6}$ carboxylate.

Still further examples of anions are deprotonated amino acids, for example, Isoleucine, Alanine, Leucine, Asparagine, Lysine, Aspartic Acid, Methionine, Cysteine, Phenylalanine, Glutamic Acid, Threonine, Glutamine, Tryptophan, Glycine, Valine, Proline, Selenocysteine, Serine, Tyrosine, Arginine, Histidine, Ornithine, Taurine.

It is also contemplated that other anions can be used in some instances, such as halides, (i.e., $F^-$, $Cl^-$, $Br^-$, and $I^-$), $CO_3^{2-}$; $NO_2^-$, $NO_3^-$, $SO_4^{2-}$, $CN^-$, arsenate(V), $AsX_6^-$; $AsF_6^-$, and the like; stibate(V) (antimony), $SbX_6^-$; $SbF_6^-$, and the like.

Other non-limiting examples of ionic liquid anions include substituted azolates, that is, five membered heterocyclic aromatic rings that have nitrogen atoms in either positions 1 and 3 (imidazolates); 1, 2, and 3 (1,2,3-triazolates); or 1, 2, 4 (1, 2, 4-triazolate). Substitutions to the ring occur at positions that are not located in nitrogen positions (these are carbon positions) and include CN (cyano-), $NO_2$ (nitro-), and $NH_2$ (amino) group appended to the heterocyclic azolate core.

In some examples of suitable ionic liquids, an anion is chosen from formate, acetate, propionate, butyrate, $(CF_3)SO_3^-$, $(R^{10}O)S(=O)_2O^-$; $(R^{10}O)_2P(=O)O-$; $(R^{10}O)C(=O)O^-$; and $R^{10}CO_2^-$; each $R^{10}$ is independently $C_1$-$C_6$ alkyl. The anion portion of the ionic liquid can be written without the charge, for example, OAc, $CHO_2$, Cl, Br, $RCH_3OPO_2$, and $PF_6$.

In some examples, wherein the ionic liquid comprises a cation and an anion, wherein the cation is selected from the group consisting of:

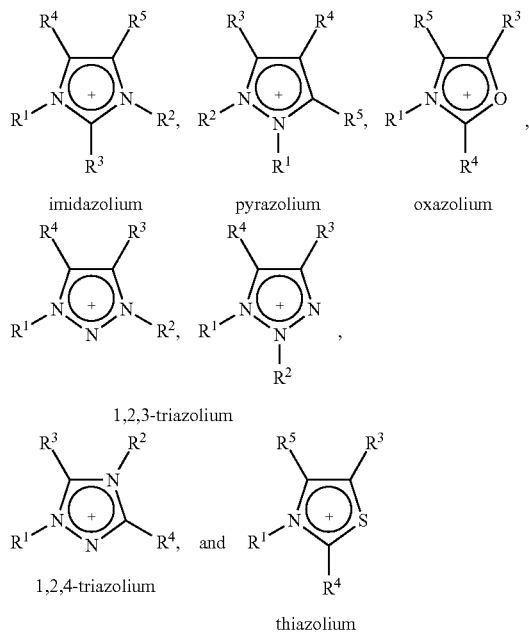

imidazolium pyrazolium oxazolium
1,2,3-triazolium
1,2,4-triazolium and thiazolium where each $R^1$ and $R^2$ is, independently, a substituted or unsubstituted linear, branched, or cyclic $C_1$-$C_6$ alkyl, or substituted or unsubstituted linear, branched, or cyclic $C_1$-$C_6$ alkoxy; each $R^3$, $R^4$, $R^5$, $R^6$, $R^7$, $R^8$, and $R^9$ is, independently, hydrogen, substituted or unsubstituted linear, branched, or cyclic $C_1$-$C_6$ alkyl, substituted or unsubstituted linear, branched, or cyclic $C_1$-$C_6$ alkoxy, or substituted or unsubstituted linear or branched, $C_1$-$C_6$ alkoxyalkyl; and wherein the anion is selected from the group consisting of $C_1$-6 carboxylate, halide, $CO_3^{2-}$; $NO_2^-$, $NO_3^-$, $SO_4^{2-}$, $CN^-$, $R^{10}CO_2$, $(R^{10}O)_2P(=O)O$, $(R^{10}O)S(=O)_2O$, or $(R^{10}O)C(=O)O$; where $R^{10}$ is hydrogen; substituted or unsubstituted linear, branched, or cyclic alkyl; substituted or unsubstituted linear, branched, or cyclic alkoxy; substituted or unsubstituted aryl; substituted or unsubstituted aryloxy; substituted or unsubstituted heterocyclic; and substituted or unsubstituted heteroaryl.

In some examples, the ionic liquid is a 3-alkyl-1-alkyl imidazolium $C_1$-$C_6$ carboxylate, for example, 3-ethyl-1-methyl-imidazolium acetate, $[C_2\text{mim}]\text{OAc}$.

Any ionic liquid that effectively dissolves the chitin present in the biomass or source of chitin can be used in the methods disclosed herein. What is meant by "effectively dissolves" is 25% by weight or more of the chitin present is solubilized (e.g., 45% or more, 60% or more, 75% or more, or 90% or more). The formulator can select the ionic liquid for use in the disclosed methods by the one or more factors, for example, solubility of the biomass and/or the chitin.

It is further understood that the disclosed ionic liquids can include solvent molecules (e.g., water); however, these solvent molecules are not required to be present in order to form the ionic liquids. That is, these compositions can contain, at some point during preparation and application no or minimal amounts of solvent molecules that are free and not bound or associated with the ions present in the ionic liquid composition.

The disclosed ionic liquids can be substantially free of water in some examples (e.g., immediately after preparation of the compositions and before any further application of the compositions). By substantially free is meant that water is present at less than about 10, 9, 8, 7, 6, 5, 4, 3, 2, 1, 0.5, 0.25, or 0.1 wt. %, based on the total weight of the composition.

The ionic liquids can, after preparation, be further diluted with solvent molecules (e.g., water) to form a solution suitable for application. Thus, the disclosed ionic liquids can be liquid hydrates, solvates, or solutions. It is understood that solutions formed by diluting ionic liquids, for example, possess enhanced chemical properties that are unique to ionic liquid-derived solutions.

In some examples, contacting the chitinous biomass with the ionic liquid can further comprise heating the chitinous biomass in the ionic liquid to form the mixture. For example, the chitinous biomass can be contacted with the ionic liquid at a temperature from about 0° C. to 160° C. In some examples, the methods can further comprise heating the chitinous biomass in the ionic liquid at a temperature of about 20° C. or more (e.g., about 25° C. or more, about 30° C. or more, about 35° C. or more, about 40° C. or more, about 45° C. or more, about 50° C. or more, about 55° C. or more, about 60° C. or more, about 65° C. or more, about 70° C. or more, about 75° C. or more, about 80° C. or more, about 85° C. or more, about 90° C. or more, about 95° C. or more, about 100° C. or more, about 105° C. or more, about 110° C. or more, about 115° C. or more, about 120° C. or more, about 125° C. or more, about 130° C. or more, about 135° C. or more, about 140° C. or more, about 145° C. or more, or about 150° C. or more). In some examples, the methods can further comprise heating the chitinous biomass in the ionic liquid at a temperature of about 160° C. or less (e.g., about 155° C. or less, about 150° C. or less, about 145° C. or less, about 140° C. or less, about 135° C. or less, about 130° C. or less, about 125° C. or less, about 120° C. or less, about 115° C. or less, about 110° C. or less, about 105° C. or less, about 100° C. or less, about 95° C. or less, about 90° C. or less, about 85° C. or less, about 80° C. or less, about 75° C. or less, about 70° C. or less, about 65° C. or less, about 60° C. or less, about 55° C. or less, about 50° C. or less, about 45° C. or less, about 40° C. or less, about 35° C. or less, about 30° C. or less, or about 25° C. or less).

The temperature at which the chitinous biomass in the ionic liquid is heated can range from any of the minimum values described above to any of the maximum values described above. For example, the methods can further comprise heating the chitinous biomass in the ionic liquid at a temperature from about 20° C. to about 100° C. (e.g., from about 20° C. to about 60° C., from about 60° C. to about 100° C., from about 20° C. to about 40° C., from about 40° C. to about 60° C., from about 60° C. to about 80° C., from about 80° C. to about 100° C., or from about 30° C. to about 90° C.).

In some examples, microwave irradiation can be used to heat the chitinous biomass in the ionic liquid to form the mixture. In other words, in some examples, heating the chitinous biomass in the ionic liquid comprises microwave irradiating the chitinous biomass in the ionic liquid to form the mixture. The frequency of the microwave irradiation can, for example, be from 2.45 to 24.125 GHz, e.g., 2.45 GHz, 5.8 GHz, or 24.125 GHz. In some examples, the microwave irradiation is continuous.

In some examples, the microwave radiation is pulsed. For example, the microwave irradiation can be conducted with pulses of 1 second or more with stirring between pulses (e.g., 2 seconds or more, 3 seconds or more, 4 seconds or more, 5 seconds or more, 6 seconds or more, 7 seconds or more, 8 seconds or more, 9 seconds or more, 10 seconds or more, 15 seconds or more, 20 seconds or more, or 25 seconds or more). In some examples, the microwave irradiation can be conducted with pulses of 30 seconds or less (e.g., 25 seconds or less, 20 seconds or less, 15 seconds or less, 10 seconds or less, 9 seconds or less, 8 seconds or less, 7 seconds or less, 6 seconds or less, 5 seconds or less, 4 seconds or less, 3 seconds or less, or 2 seconds or less). The duration of the pulse of microwave irradiation can range from any of the minimum values described above to any of the maximum values described above. For example, the microwave irradiation can be conducted with pulses of from 1 second to 30 seconds (e.g., from 1 second to 15 seconds, from 15 seconds to 30 seconds, from 1 second to 25 seconds, from 1 second to 20 seconds, from 1 second to 10 seconds, from 1 second to 5 seconds, or from 2 seconds to 3 seconds).

In some examples, the microwave irradiation can conducted for a total irradiation time of 1 minute or more (e.g., 2 minutes or more, 3 minutes or more, 4 minutes or more, 5 minutes or more, 6 minutes or more, 7 minutes or more, 8 minutes or more, 9 minutes or more, 10 minutes or more, 15 minutes or more, 20 minutes or more, or 25 minutes or more). In some examples, the microwave irradiation can conducted for a total irradiation time of 30 minutes or less (e.g., 25 minutes or less, 20 minutes or less, 15 minutes or less, 10 minutes or less, 9 minutes or less, 8 minutes or less, 7 minutes or less, 6 minutes or less, 5 minutes or less, 4 minutes or less, 3 minutes or less, or 2 minutes or less). The total irradiation time of the microwave irradiation can range from any of the minimum values described above to any of the maximum values described above. For example, the microwave irradiation can be conducted for a total irradiation time of from 1 minute to 30 minutes (e.g., from 1 minute to 15 minutes, from 15 minutes to 30 minutes, from 1 minute to 25 minutes, from 1 minute to 20 minutes, from 1 minute to 10 minutes, from 1 minute to 5 minutes, or from 3 minutes to 5 minutes).

In some examples, the microwave irradiation is conducted with 1-30 second pulses for a total of 1-60 min irradiation time with stirring between the pulses. In some examples, the microwave irradiation is conducted with 2-3 second pulses for a total of 3-5 min irradiation time with stirring between the pulses.

In some examples, the methods can further comprise agitating the mixture. Agitating the mixture can be accomplished by any means known in the art. In some examples, agitating the mixture can comprise stirring the mixture.

The mixture can comprise from about 0 wt. % to about 25 wt. % of chitin (e.g., about 1 wt. %, about 2 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, about 15 wt. %, about 16 wt. %, about 17 wt. %, about 18 wt. %, about 19 wt. %, about 20 wt. %, about 21 wt. %, about 22 wt. %, about 23 wt. %, about 24 wt. %, or about 25 wt. %, where any of the stated values can form an upper or lower endpoint of a range).

The methods further comprise contacting the mixture with an aqueous solution of a kosmotropic salt, thereby coagulating the chitin and forming a biphasic system comprising an ionic liquid-chitin phase and an aqueous kosmotropic salt phase. As used herein, a "kosmotropic salt" is any salt that contributes to the stability and structure of water-water interactions, e.g., that causes water molecules to favorably interact. In some examples, the kosmotropic salt comprises an anion and a cation, wherein the anion is selected from the group consisting of $CO_3^{2-}$, $SO_4^{2-}$, $PO_4^{3-}$, $HPO_4^{2-}$, $H_2PO_4^-$, $Cl^-$, $HCO_3^-$, $F^-$, $OH^-$, and $S_2O_3^{2-}$. In some examples, the kosmotropic salt comprises $K_3PO_4$, $K_2HPO_4$, $Na_3PO_4$, $Na_2HPO_4$, $NaH_2PO_4$, $K_2CO_3$, $KOH$, $NaOH$, $KHCO_3$, $NaHCO_3$, $NasS_2O_3$, or a combination thereof.

The concentration of the kosmotropic salt in the aqueous solution can, for example, be from about 0 wt. % to about 60 wt. %. In some examples, the concentration of the kosmotropic salt in the aqueous solution is from about 30 wt. % to about 50 wt. %. In other examples, the concentration of the kosmotropic salt in the aqueous solution is about 5 wt. %, 10 wt. %, 15 wt. %, 20 wt. %, 25 wt. %, 30 wt. %, 35 wt. %, 40 wt. %, 45 wt. %, 50 wt. %, 55 wt. %, 60 wt. %, where any of the stated values can form an upper or lower endpoint of a range.

The mixture and the aqueous solution of the kosmotropic salt can respectively be provided in amounts such that the weight ratio of the aqueous solution of the kosmotropic salt in to the mixture in wt. % is 2:1.

In some examples, the mixture is contacted with the aqueous solution of the kosmotropic salt under agitation. Agitation can be accomplished by any means known in the art. In some examples, the agitation comprises stirring.

The methods can further comprise separating the ionic liquid-chitin phase from the aqueous kosmotropic salt phase. The ionic liquid-chitin phase can be separated from the aqueous kosmotropic salt phase in any manner chosen by the formulator, for example, by decanting.

The separated ionic liquid-chitin phase can, for example, further comprise water. In some examples, the amount of water in the separated ionic liquid-chitin phase is about 50 wt. % or less (e.g., about 45 wt. % or less, about 40 wt. % or less, about 35 wt. % or less, about 30 wt. % or less, about 25 wt. % or less, about 20 wt. % or less, about 15 wt. % or less, about 10 wt. % or less, about 5 wt. % or less, or about 1 wt. % or less).

The methods can further comprise collecting the chitin from the separated ionic liquid-chitin phase, thereby forming a recycled ionic liquid. The chitin can be isolated in any manner chosen by the formulator, for example, the chitin can be removed by centrifugation, filtration, or by decanting the liquid phase. In some examples, the chitin is collected from the separated ionic liquid-chitin phase by centrifugation or filtration. The collected chitin can, in some examples, comprises about 4 wt. % or less of a protein (e.g., about 3.5 wt. % or less, about 3 wt. % or less, about 2.5 wt. % or less, about 2 wt. % or less, about 1.5 wt. % or less, about 1 wt. % or less, or about 0.5 wt. % or less).

In some examples, the methods can further comprise washing the collected chitin with a solvent. Examples of solvents include, but are not limited to, methanol, ethanol, propanol, isopropanol, acetone, hexane, benzene, hexane, acetonitrile, water, or combinations thereof. In some examples, the solvent is water.

In some examples, the recycled ionic liquid is used to contact the chitinous biomass. Also, disclosed herein are methods of recycling an ionic liquid. In these methods a mixture comprising an ionic liquid and water is contacted with a kosmotropic salt, thereby forming an aqueous biphasic system comprising an ionic liquid phase and an aqueous phase. The ionic liquid phase can then be separated from the aqueous phase and isolated. These methods can be used with mixtures comprising water and any of the ionic liquids disclosed herein, e.g. ionic liquids used to dissolve chitin. Any of the kosmotropic salts disclosed herein (e.g., potassium phosphate ($K_3PO_4$)) can be used in any of the amounts disclosed herein. While not wishing to be bound by theory, the kosmotropic salt withdraws some of the water present in the mixture, forming an aqueous biphasic system (ABS) that can be removed. The disadvantage of high energy needed for evaporation of the water is thus avoided.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention, which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

All reagents were purchased form VWR International, and used as received. The ionic liquid, 1-ethyl-3-methylimidazolium acetate ([$C_2$mim][OAc], purity >95%), was purchased from IoLiTec, Inc. (Tuscaloosa, Ala.). Triply deionized (DI) water (18.2 MΩ cm) was used for the preparation of sodium phosphate buffer (pH 7.4/10 mM), preparation of a kosmotropic salt solutions and coagulation of chitin. Dried shrimp shells were obtained from Gulf Coast Agricultural and Seafood Cooperative in Bayou La Batre, Ala. The detailed factory-processing of these shrimp shells can be found in the literature (Qin Y et al. *Green Chem.* 2010, 12, 968-971).

The dried shrimp shells obtained from Gulf Coast Agricultural and Seafood Cooperative were further processed: ground by use of an electric lab mill (Model M20 S3, IKA™, Wilmington, N.C.) and sieved through a stainless steel mesh sieves, in order to obtain shrimp-shell particles with diameters less than 125 µm. Finally, the sieved particles were dried at 90° C. overnight in an oven (Precision Econotherm Laboratory Oven, Winchester, Va.).

Dry, ground, and sieved shrimp shells were used to extract chitin using a microwave-assisted procedure. Briefly, 1.22 g of shrimp shells and 60.0 g of the ionic liquid were added into a 250 mL Erlenmeyer flask. Then the two components were mixed well using a stir-rod for five minutes, and heated by use of 90-100 microwave pulses (Emerson MW8999SB, Emerson Radio Corp., Moonachie, N.J.). Each pulse was estimated to be two to three seconds, and in between each pulse, the reaction mixture was stirred manually using a glass rod, for few seconds, to allow even heat distribution. Afterwards, the hot reaction mixture was centrifuged (Dynac Becton Dickinson Centrifuge model 42010, Sparks, Md.) at 3000 rpm for 15 min so that all the undissolved shrimp shell residues can be removed from the chitin extract. Then the supernatant was separated into a clean beaker and coagulated using different methods.

The combination of the $^{13}$C cross-polarization (CP) technique with magic angle spinning (MAS) was performed using Varian J solid-state nuclear magnetic resonance (NMR) experiments. The 1D spectrum is based on natural abundance $^{13}$C in chitin by polarization transfer from abundant $^1$H nuclei spins and by eliminating broadening from chemical shift anisotropy and dipolar coupling. The CP MAS technique was chosen over a regular single-pulse due to the sensitivity enhancement, which arises from both the polarization transfer from the protons to the carbons and to the short relaxation times.

Example 1. Coagulation of Chitin Obtained by Ionic Liquid Extraction Using Microwave Irradiation (with Stirring)

In addition to recycling the ionic liquids used for extraction, it is important to find ways to obtain pure chitin because proteins constitute a substantial portion of biomass (Barber P S et al. *Pure Appl. Chem.* 2013, 85, 1693-1701; Black M and Schwartz H M. *Analyst* 1950, 75, 185-189). Common deproteinization techniques employed during the chitin-isolation processes include chemical, enzymatic and microbiological methods (Valdez-Peña A U et al. *Food Sci. Biotechnol.* 2010, 19, 553-557; Younes I et al. *Process Biochem.* 2012, 47, 2032-2039; Jung W et al. *Crit. Rev. Food Sci. Nutr.* 2007, 68, 746-750), that are complex and energy- and time-consuming (enzymatic), hazardous and could chemically alter the final chitin product (chemical, NaOH). In the case of ionic liquid-assisted chitin isolation, the quality of the isolated chitin can also be affected by any dissolved, denatured proteins which might accumulate as byproducts of the extraction.

Hydrophilic ionic liquids, such as [$C_2$mim][OAc], are capable of forming an aqueous biphasic system (ABS) in the presence of a concentrated solution of kosmotropic salt (e.g., $K_3PO_4$, $K_2HPO_4$, $Na_2S_2O_3$, etc.). Aqueous biphasic systems have been applied to the salting-out effect of proteins, where proteins in an aqueous solution tend to precipitate and prevent unfolding at high salt (e.g., $K_3PO_4$) concentrations (Mevarech M et al. *Biophys. Chem.* 2000, 86, 155-164; Zafarani-Moattar M T and Hamzehzadeh S. *Journal of Chemical & Engineering Data* 2010, 55, 1598-1610; Arakawa T and Timasheff S N. *Biochemistry* 1984, 23, 5912-5923; Zafarani-Moattar M T et al. *Biotechnol. Progr.* 2012, 28, 146-156). Therefore, the use of the aqueous biphasic system technique may be helpful for simultaneous deproteinization of chitin extracted from crustacean shells and ionic liquid-recycle.

Disclosed herein is a chitin coagulation technique coupled to an ionic liquid (IL)-based chitin isolation method (extraction). In this example, chitin extracted from crustacean shells using a 1-ethyl-3-methylimidazolium acetate ([$C_2$mim][OAc]) ionic liquid, the chitin is then precipitated (coagulated) using a kosmotropic $K_3PO_4$ aqueous solution as anti-solvent in place of commonly used water or ethanol. The addition of kosmotropic $K_3PO_4$ to the ionic liquid solution of chitin simultaneously results in chitin coagulation and a formation of aqueous biphasic system (ABS) comprised of an upper ionic liquid-rich phase and a lower $K_3PO_4$-rich phase causing chitin polymer precipitation and dehydration of the ionic liquid, at the same time. As compared to traditional chitin coagulation process after ionic liquid extraction (e.g., using water or ethanol as anti-solvents), the formation of an aqueous biphasic system prevents the complete dissolution of the ionic liquid in the aqueous $K_3PO_4$, hence limiting the water uptake by the ionic liquid. As a result, a much lower amount of water accumulates in the ionic liquid during the process of coagulation and therefore recycling (dehydration) of the ionic liquid can be simpler and less-expensive. The methods described herein utilizing a kosmotropic $K_3PO_4$ solution as an anti-solvent can also result in purer chitin, that contains only ca. 0.3 wt. % proteins, as opposed to ca. 4.5 wt. % proteins in chitin coagulated using water as anti-solvent, without the employment of any additional deproteinization steps.

In the extraction of chitin from chitninous biomass using an ionic liquid, either biomass (thermally pre-treated or not) or chitin (commercial or ionic liquid-regenerated) is dissolved in the ionic liquid, using microwave irradiation or thermal dissolution, and then the chitin precipitation takes place through the addition of anti-solvent (water) to the ionic liquid-polymer solution. Aiming at developing more benign methodology, the methods described herein describe an approach of simultaneous coagulation of chitin and control of amount of water absorbed by the ionic liquid. This is achieved through the use of anti-solvent capable of forming an aqueous biphasic system with the ionic liquid, namely a $K_3PO_4$ aqueous solution. When the $K_3PO_4$ aqueous solution is added to ionic liquid-chitin solution, water from the $K_3PO_4$ (aq) slowly diffuses into the ionic liquid-chitin phase and results in polymer (chitin) coagulation. At the same time, the amount of water able to diffuse into the ionic liquid is restricted by the formation of the aqueous biphasic system.

Figure 2:
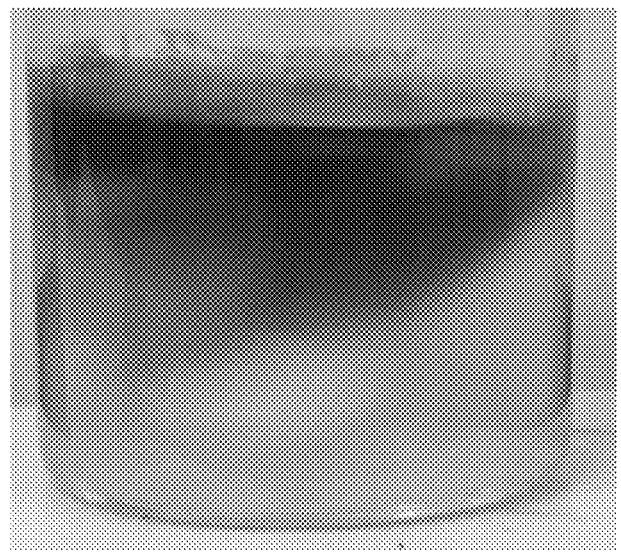
FIG. 2 is a photograph of the coagulation of chitin from a solution of shrimp shell extract in [C$_2$mim][OAc] using K$_3$PO$_4$ and assisted by continuous, vigorous stirring.

In extraction of chitin from biomass using an ionic liquid, a 2 wt. % solution of dry shrimp shells was dissolved in 1-ethyl-3-methylimidazolium acetate ([$C_2$mim][OAc]) ionic liquid using microwave irradiation, as described above (FIG. 1). After the dissolution of chitin was complete, it was coagulated using a concentrated solution of $K_3PO_4$ ca. 40 wt. %. First, an aqueous solution of 40 wt. % $K_3PO_4$ was added to a 100 mL beaker, and the ionic liquid-chitin solution was poured on top of the salt layer. A ~2:1 w/w ratio of the $K_3PO_4$ and the ionic liquid-chitin layer was used. During coagulation, the system was stirred vigorously (FIG. 2) in order to facilitate the diffusion of water from $K_3PO_4$ to the ionic liquid layer. After the addition of the two layers is complete, $K_3PO_4$ solution stays on the bottom, whereas the ionic liquid layer stays on the top. Then, the solution system was allowed to equilibrate for 18 h for coagulation. The coagulation can be achieved in 6-8 h if the system is stirred vigorously (800-1000 rpm) by use of a magnetic stir-bar.

Figure 3:
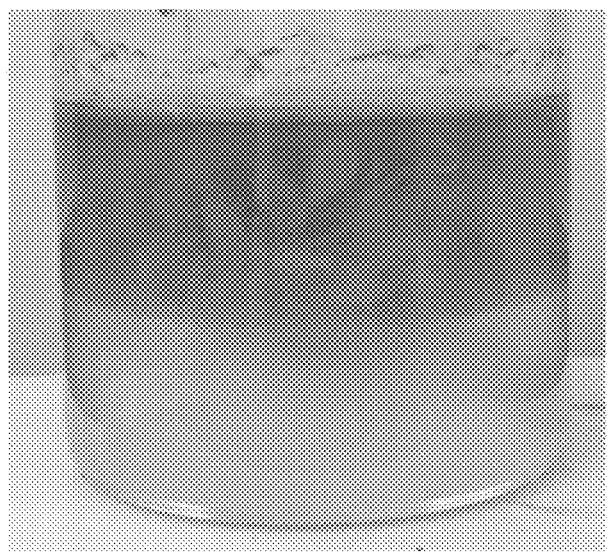
FIG. 3 is a photograph taken after coagulation of chitin from a solution of shrimp shell extract in [C$_2$mim][OAc] using K$_3$PO$_4$, an aqueous biphasic system formed with a K$_3$PO$_4$-rich layer (bottom) and an ionic liquid/chitin-rich layer (top).

After the system was settled, the two layers were clearly distinguishable, with an ionic liquid-rich layer with coagulated chitin on top, and the $K_3PO_4$-rich phase at the bottom (FIG. 3).

Figure 4:
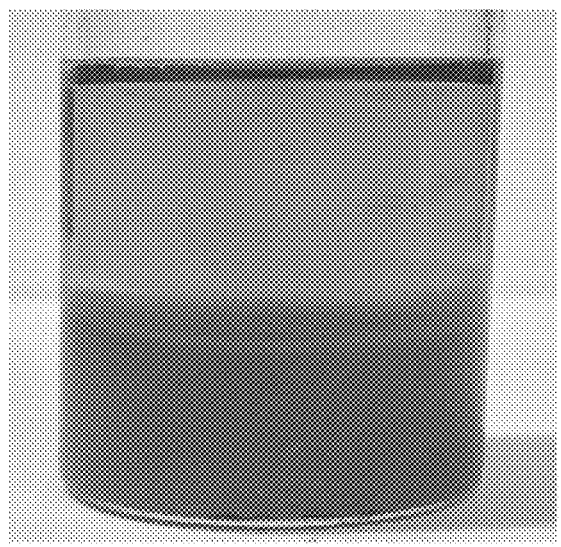
FIG. 4 is a photograph of the ionic liquid-chitin layer after centrifugation.
Figure 5:
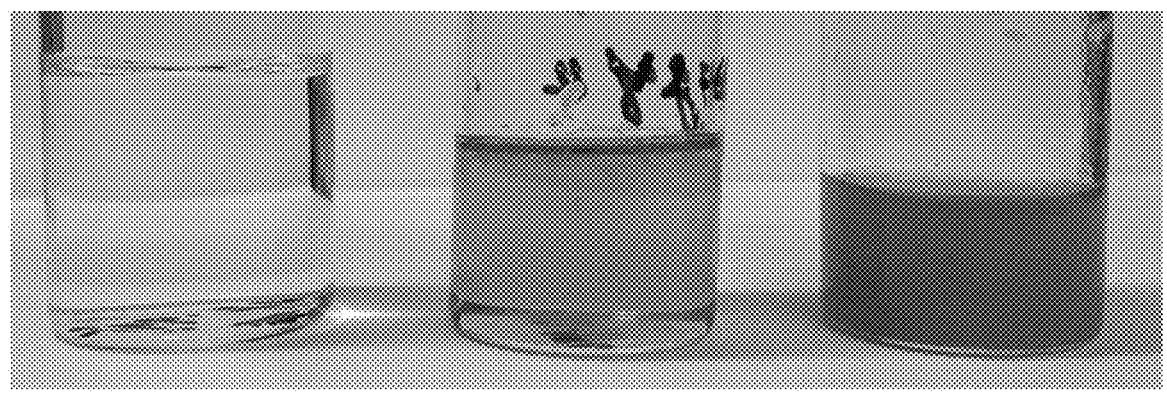
FIG. 5 is a photograph of the K$_3$PO$_4$-rich layer (left), ionic liquid-rich layer (middle), and coagulated chitin before washing step.
Figure 6:
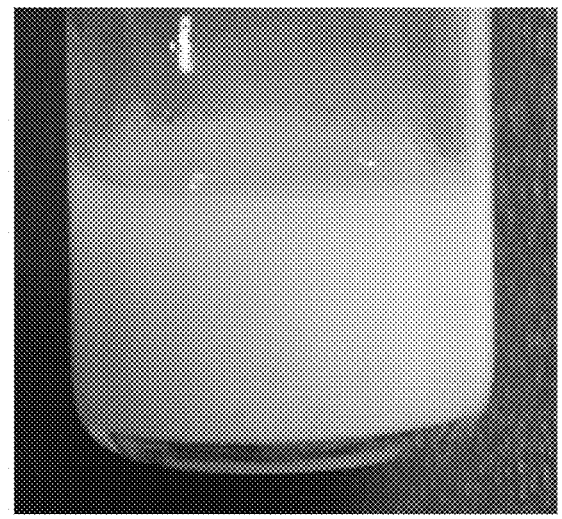
FIG. 6 is a photograph of chitin after washing with water.
Figure 7:
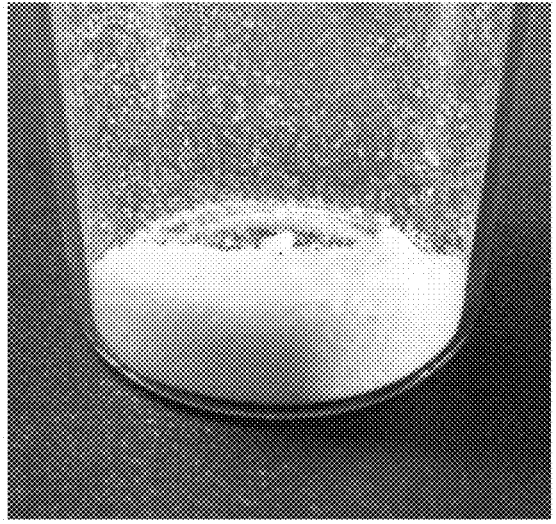
FIG. 7 is a photograph of isolated oven—dried chitin powder.

After coagulation, the bottom layer was pipetted-out, and the ionic liquid-rich layer was stirred vigorously for two hours in order to separate the ionic liquid from coagulated chitin. Then, the system was heated for 15 min at 90° C. and centrifuged to remove the ionic liquid from chitin (FIG. 4). The appearances of separated $K_3PO_4$-rich phase, aqueous ionic liquid solution, and coagulated chitin before washing with water is given on FIG. 5. As can be observed from FIG. 6, the separated chitin product had a brown color, which was due to presence of ionic liquid. The separated chitin product was washed with distilled water for 12 times in order to remove traces of ionic liquid, and dried at 90° C. overnight. The washed chitin appeared white, as shown in FIG. 7.

For comparison, the ionic liquid-chitin mixture obtained from the aforementioned extraction procedure was coagulated by use of approximately 400 mL of water. Then, the ionic liquid-chitin-water mixture was stirred overnight (~12 h) in order to achieve maximum coagulation of chitin and dissolution of ionic liquid in water. Then, the reaction mixture was allowed to settle for few hours and the supernatant is decanted. Next, the remaining white flock, i.e. coagulated standard chitin, was carefully separated into four centrifuge tubes (60 mL) and centrifuged at 3000 rpm for 15 min in order to further remove the aqueous layer. Afterwards, the separated white solid was cleaned using DI water for 12 cycles (add water-centrifuge-decant supernatant). The wet chitin product was transferred into a glass Petri dish and dried overnight at 90° C. Finally, the dried shrimp-shell chitin was ground and sieved (<125 μm) prior to use.

The complete mass balance for the salt-assisted coagulation process of chitin using 2 wt. % dry shrimp-shells is given below in Table 1. After this process, the amount of water of the top layer was estimated by use of Karl-Fischer titration, and it was found to be 26.5±2.7 wt. %. Conventionally, standard coagulation method adds more than 50 wt. % of water into the ionic liquid during coagulation process (Cho Y I et al. *J. Agric. Food. Chem.* 1998, 46, 3839-3843). Therefore, the salt-assisted coagulation method is capable of coagulating chitin by adding a significantly lower amount of water in to the ionic liquid, which is very promising towards recycling the ionic liquid.

TABLE 1

Dehydration of the ionic liquid using aqueous biphasic system.

| | In | | | Out | | | | | |
|---|---|---|---|---|---|---|---|---|---|
| IL-Water | Wet IL, 20 g | | $K_3PO_4$ Solid | IL-rich layer | | | Water rich layer | | |
| Water % | Water (g) | IL (g) | $K_3PO_4$ (g) | IL (g) | $K_3PO_4$ (g) | Water (g) | IL (g) | $K_3PO_4$ (g) | Water (g) |
| 70 | 14.0 | 6.0 | 14.0 | 6.0 | 0.3 | 5.3 | 0.0 | 13.7 | 8.7 |
| 60 | 12.0 | 8.0 | 12.0 | 8.0 | 0.3 | 5.9 | 0.0 | 11.7 | 6.1 |
| 50 | 10.0 | 10.0 | 10.0 | 10.0 | 0.3 | 4.4 | 0.0 | 9.7 | 5.6 |
| 40 | 4.0 | 6.0 | 4.0 | 6.0 | 0.2 | 2.7 | 0.0 | 3.8 | 1.3 |
| 30 | 6.0 | 14.0 | 6.0 | 14.0 | 0.4 | 3.5 | 0.0 | 5.6 | 2.5 |

The composition of ionic liquid- and $K_3PO_4$-rich layers, separated after chitin coagulation was investigated by $^1H$ NMR spectroscopy. Analysis of $^1H$ NMR spectrum of ionic liquid-rich layer revealed only presence of water. Conversely, ionic liquid was not detected in $K_3PO_4$-rich layer (bottom layer), indicating no substantial ionic liquid loss during the aqueous biphasic system formation. In addition, the $K_3PO_4$ layer is colorless, which also supports this conclusion. The amount of ionic liquid in the salt-rich layer during the coagulation can be also estimated using the phase diagram for the [$C_2$mim][OAc], $K_3PO_4$, and water system reported in the literature. According to this phase diagram, the aqueous biphasic system used for the coagulation has negligible amount of ionic liquid leaking in the $K_3PO_4$-rich layer. Additionally, $^1H$-NMR spectrum of $K_3PO_4$-rich layer had small impurity peaks that might be attributed to proteins removed from the ionic liquid layer during the coagulation process.

To compare the effect of salt-assisted coagulation, on chitin chain confirmation, crystallinity and potential salt-contamination Powder X-Ray Diffraction (PXRD) and FTIR were taken from chitin isolated using the above salt-assisted method, chitin isolated from shrimp shell by coagulation in water as anti-solvent (standard chitin), and commercially available practical grade chitin (PG-chitin). To show the versatility of the salt-assisted method, standard chitin and PG-chitin were thermally re-dissolved in ionic liquids followed by coagulation with salt-assisted method. The chitin obtained after re-dissolution and coagulation (regenerated standard chitin and regenerated PG-chitin), was also characterized by FTIR and Powder X-Ray Diffraction.

Figure 8:
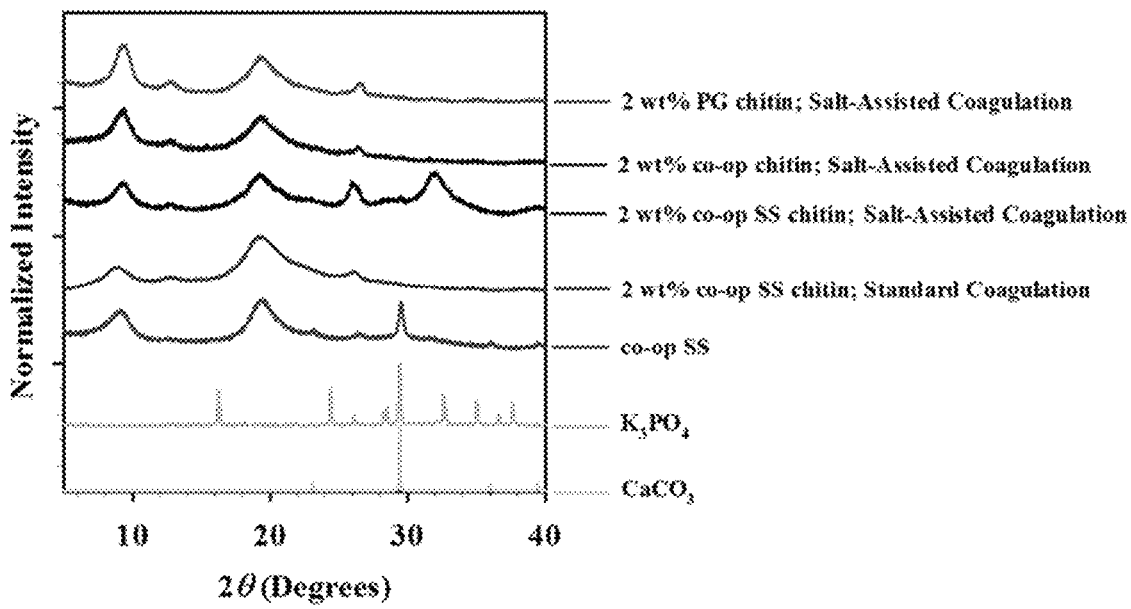
FIG. 8 is the Powder X-Ray Diffraction spectra of different chitin products obtained from salt-assisted and standard coagulation methods along with starting materials.

First, Powder X-Ray Diffraction data was taken from standard chitin, salt-assisted chitin, regenerated standard chitin, regenerated PG-chitin and dry shrimp shells. Powder X-Ray Diffraction (PXRD) of ground samples (<125 μm) were obtained in the range of 2θ 5-40 degrees using a Bruker D2 Phaser (Bruker Optics Inc.). The Powder X-Ray Diffraction pattern obtained from all types of chitin was compared to Powder X-Ray Diffraction data obtained from $CaCO_3$ and $K_3PO_4$ as possible major contaminants remaining after the coagulation process. As can be seen from FIG. 8, all types of chitin have multiple crystalline peaks at 2θ=9.3, 12.8, 19.3 and 26.4° indexed as (020), (021), (110) and (0.13), respectively. This type of pattern corresponds to the crystalline structure of α/β-chitin (Duan B et al. *J. Mater. Chem. A* 2013, 1, 1867-187; Noishiki Y et al. *Biomacromolecules* 2003, 4, 896-899). The Powder X-Ray Diffraction pattern of the salt-assisted chitin has an additional peak at 2θ=32.1° that is not present in any of the other types of chitin or shrimp shells. Dry shrimp shells have three major peaks at 2θ=9.3, 19.3 and 29.4° (FIG. 8); the peaks at 2θ=9.3 and 19.3° are chitin peaks, while the peak at 2θ=29.4° belongs to $CaCO_3$, which is naturally present in shrimp shells. The absence of this $CaCO_3$ peak in the chitin Powder X-Ray Diffraction patterns indicates that both coagulation methods efficiently removing this component.

Another potential impurity introduced by the salt-assisted coagulation method is $K_3PO_4$. As seen from the Powder X-Ray diffractogram of $K_3PO_4$ (FIG. 8), there are multiple sharp crystalline reflections in the 2θ range of 15.8-37.8°. These peaks are not seen in the Powder X-Ray Diffraction patterns of any of the chitins isolated using the salt-assisted methods (FIG. 8), indicating that $K_3PO_4$ is not retained at a detectable amount after the coagulation and washing steps.

Next, all types of chitin were characterized with FTIR. Coagulated chitin products were characterized as ground powder (<125 μm) by use of Bruker Alpha FT-IR instrument (Bruker Optics Inc.). FTIR Spectra were analyzed in the range of 650-4000 $cm^{-1}$ with a resolution of 5 $cm^{-1}$ in the transmission mode for 8 scans at room temperature.

Figure 9:
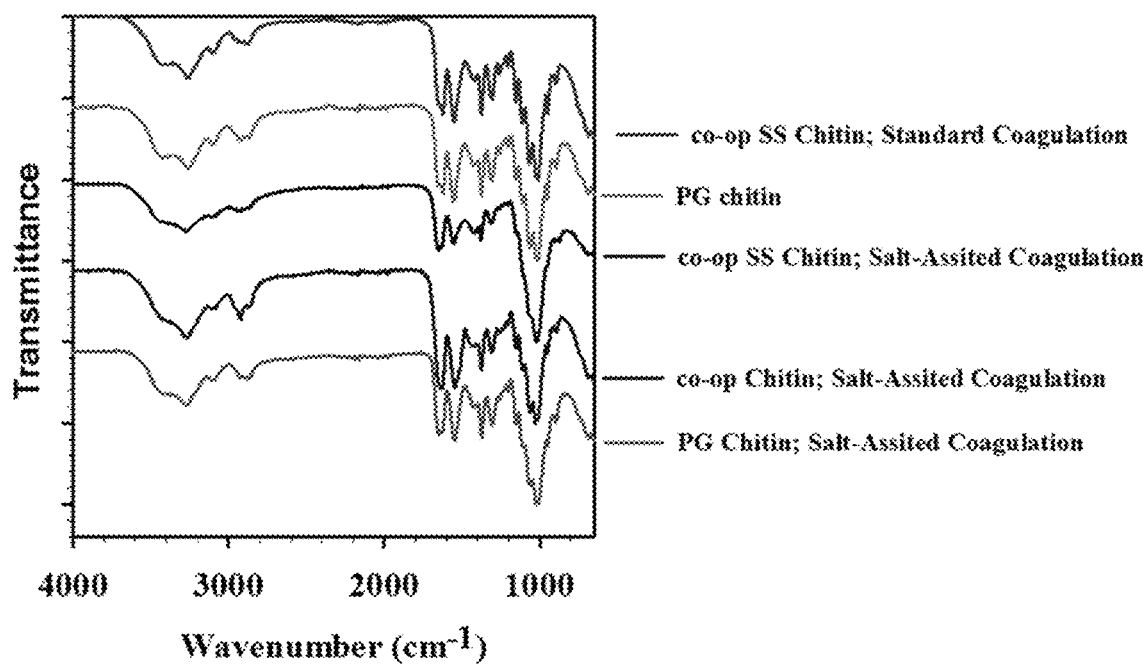
FIG. 9 is the FTIR spectra of different chitin products obtained from salt-assisted and standard coagulation methods.
Figure 10:
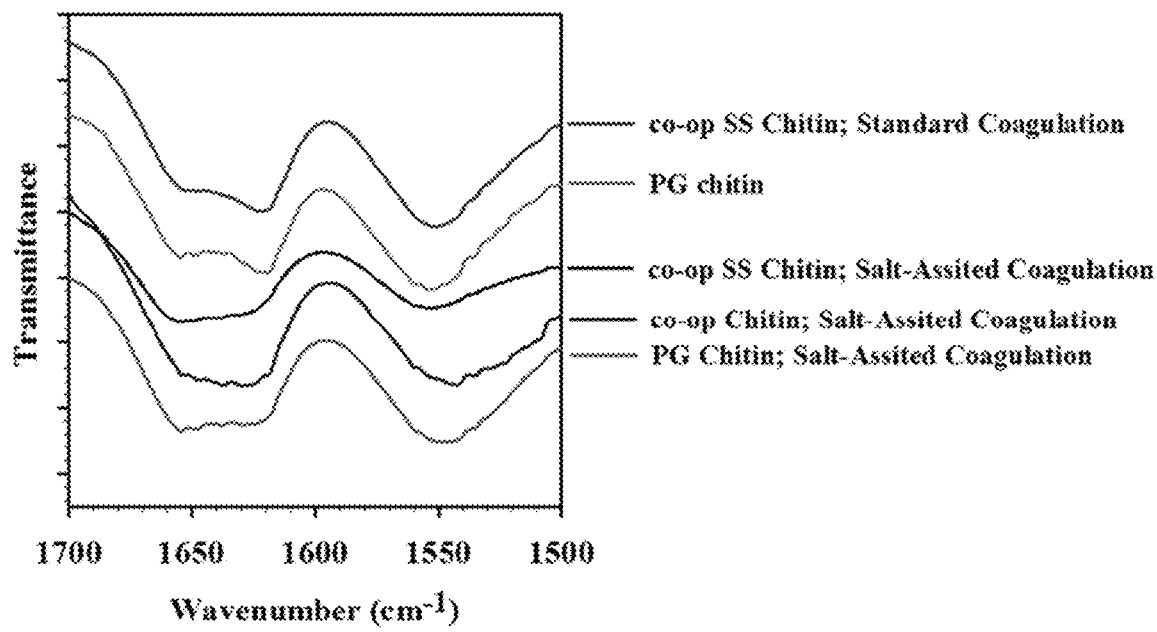
FIG. 10 is the FTIR spectra of the Amide I band of different chitin products obtained from salt-assisted and standard coagulation methods.

As seen from FIG. 9, FTIR spectra of all types of chitin have characteristic peaks of acetamido groups centered at 1658 $cm^{-1}$, 1556 $cm^{-1}$, 1376 $cm^{-1}$, and 1311 $cm^{-1}$. The amide I band divided into two peaks and appears at 1658 $cm^{-1}$ and 1620 $cm^{-1}$, and the bands at 1556 $cm^{-1}$ and at 1376 $cm^{-1}$ correspond to the amide II and amide III bands, respectively (Ding F et al. *Carbohydrate Polymers* 2012, 87, 422-426). Close examination of the amide I region (FIG. 10) revealed that PG-chitin, regenerated PG-chitin, regenerated standard, and standard chitin have two bands seen at ~1653 $cm^{-1}$ and ~1620 $cm^{-1}$, while in the salt-assisted chitin these two distinct band disappeared and the region become very broad without any distinct peaks. In the literature, the amide I region shows the inter- or intramolecular hydrogen bonding attributed to α- or β-chitin (Jung W et al. *Crit. Rev. Food Sci. Nutr.* 2007, 68, 746-750; Mevarech M et al. *Biophys. Chem.* 2000, 86, 155-164). The presence of two bands at the amide I region corresponds to α-chitin, while a single peak at ~1630-1660 $cm^{-1}$ is characteristic of β-chitin (Jung W et al. *Crit. Rev. Food Sci. Nutr.* 2007, 68, 746-750; Mevarech M et al. *Biophys. Chem.* 2000, 86, 155-164). For clarity, the primary vibrational bands observed in standard and salt-assisted chitin and bands reported in literature for α- and β-chitin are listed in Table 2 (Mevarech M et al. *Biophys. Chem.* 2000, 86, 155-164; Zafarani-Moattar M T and Hamzehzadeh S. *Journal of Chemical & Engineering Data* 2010, 55, 1598-1610). Taking both the FTIR and Powder X-Ray Diffraction data into the account, it is likely that mostly α-chitin is obtained by the standard coagulation procedure, while a mixture of α/β-chitin is obtained by salt-assisted coagulation.

TABLE 2

FTIR band positions (cm$^{-1}$) for standard and salt-assisted chitin as compared to α- and β-chitin from the literature (Mevarech M et al. *Biophys. Chem.* 2000, 86, 155-164; Zafarani-Moattar MT and Hamzehzadeh S. *Journal of Chemical & Engineering Data* 2010, 55, 1598-1610).

|  | α-chitin | β-chitin | Standard chitin | Salt-assisted chitin |
|---|---|---|---|---|
| OH Stretching | 3480 | no | no | no |
| OH Stretching | 3447 | no | 3425 | 3430* |
| NH Stretching | 3264 | 3284* | 3261 | 3280 |
| NH Stretching | 3106 | 3106 | 3103 | 3110 |
| CH$_3$ stretching | 2962-2840 (5 peaks) | 3106-2877 (1 peak, 1 shoulder) | 2963-2877 (4 peaks) | 2963-2876 (3 peaks) |
| Amide I | 1652 | 1657 | 1653 | 1655 |
| Amide I | 1619 | no | 1620 | no |
| Amide II | 1555 | 1559 | 1552 | 1553 | no—Not observed;
*shoulder

Proteins are considered as one of the major impurities that could be present in chitin. Proteins present in biomass can be co-extracted along with chitin and can impact purity and characteristics of chitin product. Current industrial chitin-extraction processes use an alkali treatment in order to remove shell-proteins from chitin (White R J et al. *J. Mater. Chem.* 2009, 19, 8645-8650). However, this treatment results in producing low molecular-weight chitins and alters the chemical structure of end product (Rinaudo M. *Progress Polym. Sci.* 2006, 3, 603-632). Alternatively, the ionic liquid-based extraction of chitin uses mild chemicals, and therefore, provides high molecular weight chitin without substantial changes to chemical structure of chitin (Percot A et al. *Biomacromolecules* 2003, 4, 12-18; Synowiecki J and Al-Khateeb N A. *Crit. Rev. Food Sci. Nutr.* 2003, 43, 145-171; Mahmoud N S et al. *Am. J Biochem. Biotechnol.* 2007, 3, 1-9; No H K et al. *J. Agric. Food Chem.* 1989, 37, 575-579; Younes I and Rinaudo M. *Mar. Drugs* 2015, 13, 1133-1174; Barber P S et al. *Pure Appl. Chem.* 2013, 85, 1693-1701). While this technique is capable of extracting chitin more efficiently, there are no designed strategies that targets removal of proteins co-extracted from biomass. The washing of coagulated chitin by use of water should remove hydrophilic proteins from chitin to some extent. However, the amount of proteins present in the final chitin product can be estimated by coupling a de-proteinization protocol to a standard protein assay.

Figure 11:
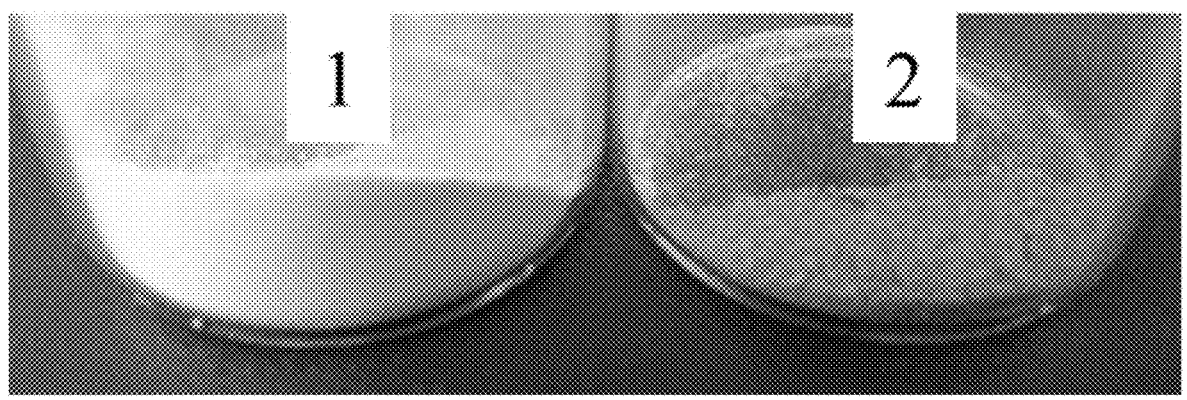
FIG. 11 is a photograph of dried shrimp shell chitin coagulated from (1) salt-assisted method and (2) standard method.

As discussed above, a change in color of the final chitin product based on the coagulation method was observed. The color of the final chitin product can be used as a preliminary indicator for purity of chitin. Generally, dry chitin isolated with standard methods appears brown in color, whereas chitin isolated using the salt-assisted methods is white (FIG. 11). Therefore, the salt-assisted coagulation methods discussed herein are capable of isolating chitin from crustacean shells with less color.

The brown color of chitin coagulated through standard methods can be attributed to the impurities present. In order to prove this hypothesis, the proteins that may be present in each chitin sample were removed using an alkali treatment. Specifically, a 1.25 M solution of NaOH was used to remove proteins from chitin samples. First, a 100 mg of chitin sample was added to a 20 mL glass screw-cap vial containing 10 mL of 1.25 M NaOH$_{(aq)}$. Then, the sample mixture was heated in an oil bath for 2 hours at 100° C. Afterwards, the supernatant was separated from the chitin by centrifugation at 3500 rpm for 15 min, and the total concentration of proteins present in the supernatant was estimated. Subsequently, the alkali treated chitin precipitate was cleaned with fresh DI water, and centrifuged for 15 min at 3000 rpm in order to remove loosely bound proteins from the chitin precipitate. Then, the cleaned precipitate was oven dried at 90° C. for 5 hours, prior to stripping any remaining proteins repeating the same protocol until there are no significant levels of proteins present in the alkali supernatant.

Figure 12:
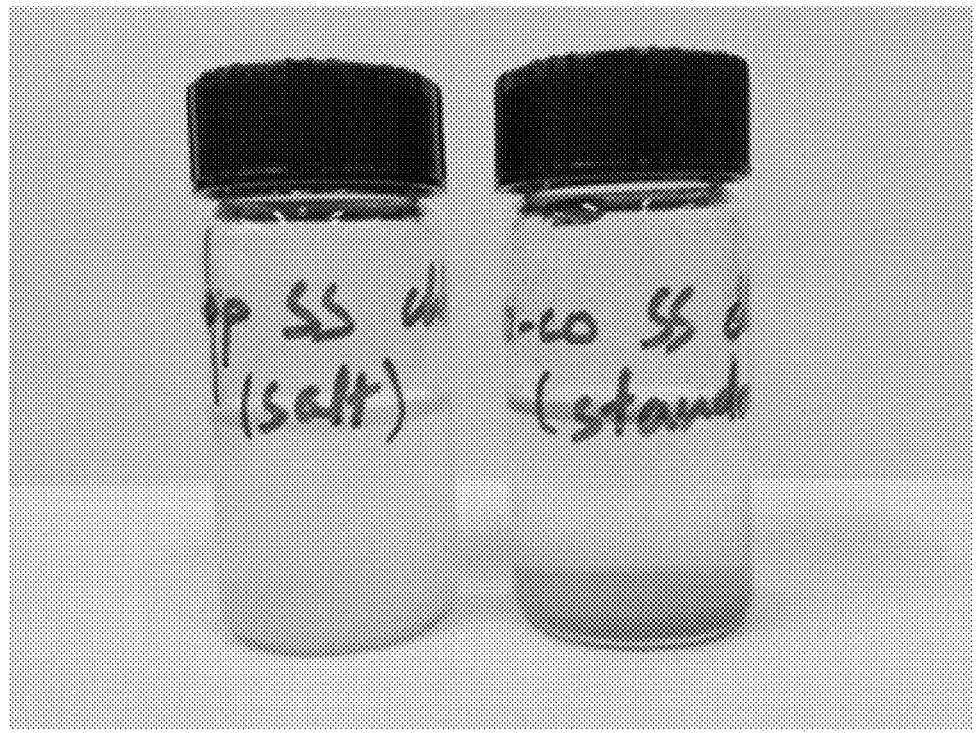
FIG. 12 is a photograph of chitin coagulated from salt-assisted method (left) and standard method (right) before de-proteinization.
Figure 13:
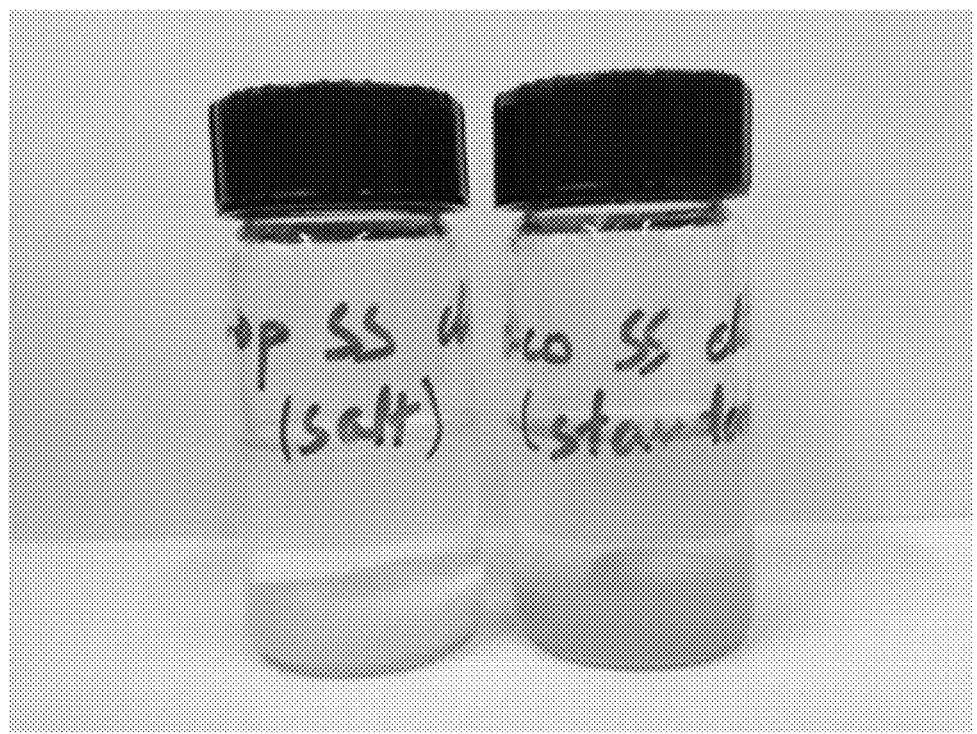
FIG. 13 is a photograph of chitin coagulated from salt-assisted method (left) and standard method (right) after de-proteinization.
Figure 14:
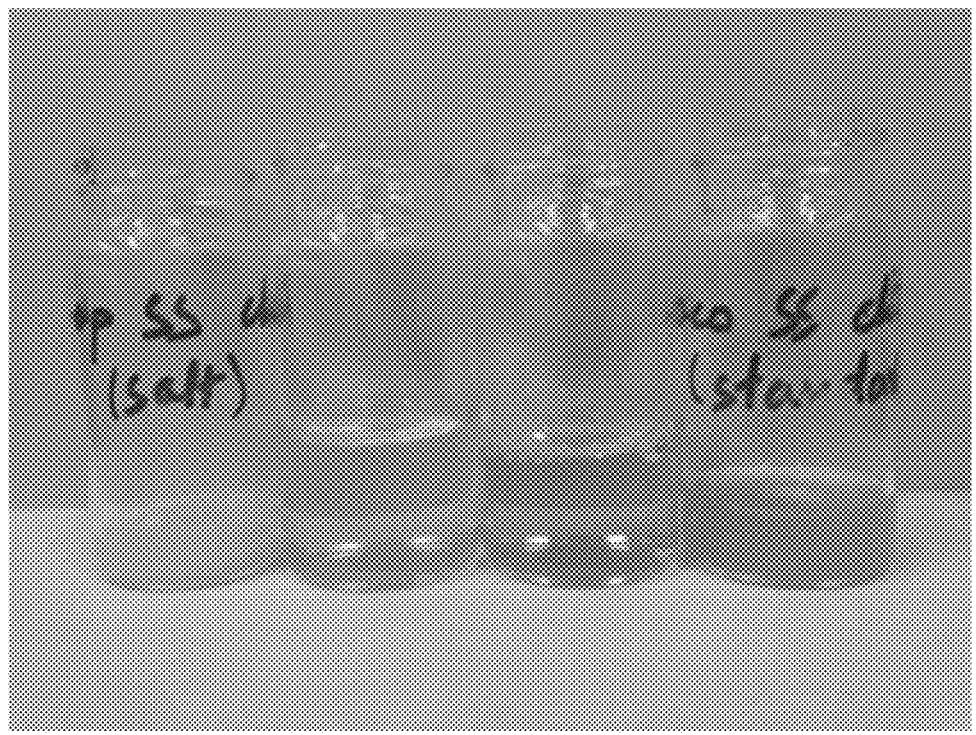
FIG. 14 is a photograph of chitin coagulated from salt-assisted method (left two) and standard method (right two) after removing the supernatant from chitin; supernatant from salt-assisted coagulation appears white whereas, the supernatant from standard coagulation appears in yellowish brown.
Figure 15:
FIG. 15 is a photograph of standard chitin, after treating with the alkali solution for multiple times.

Images of two chitin samples (standard and salt-assisted) before and after treating with the alkali solution are given in FIG. 12, FIG. 13, and FIG. 14. As can be seen from the images, the brown color of the standard chitin was diffused into the supernatant, providing a brownish color to the supernatant. However, the supernatant of the salt-assisted chitin solution remained colorless during this treatment. The brown color of standard chitin was completely removed by treating the chitin product multiple times with the alkali solution. In FIG. 15, decolorized standard chitin appears white, whereas the supernatant is colorless after treating the chitin sample with the alkali solution two times.

The total protein content of each chitin sample was estimated using a Bradford assay (Bradford M M. *Anal. Biochem.* 1976, 72, 248-254). In this method, 1.0 mL of Bradford Reagent (Bio-Rad Corporation) was introduced to 100 μL sample volume, followed by the measurement of absorbance at 595 nm using a 1 mL cuvette (1 cm path length).

Figure 16:
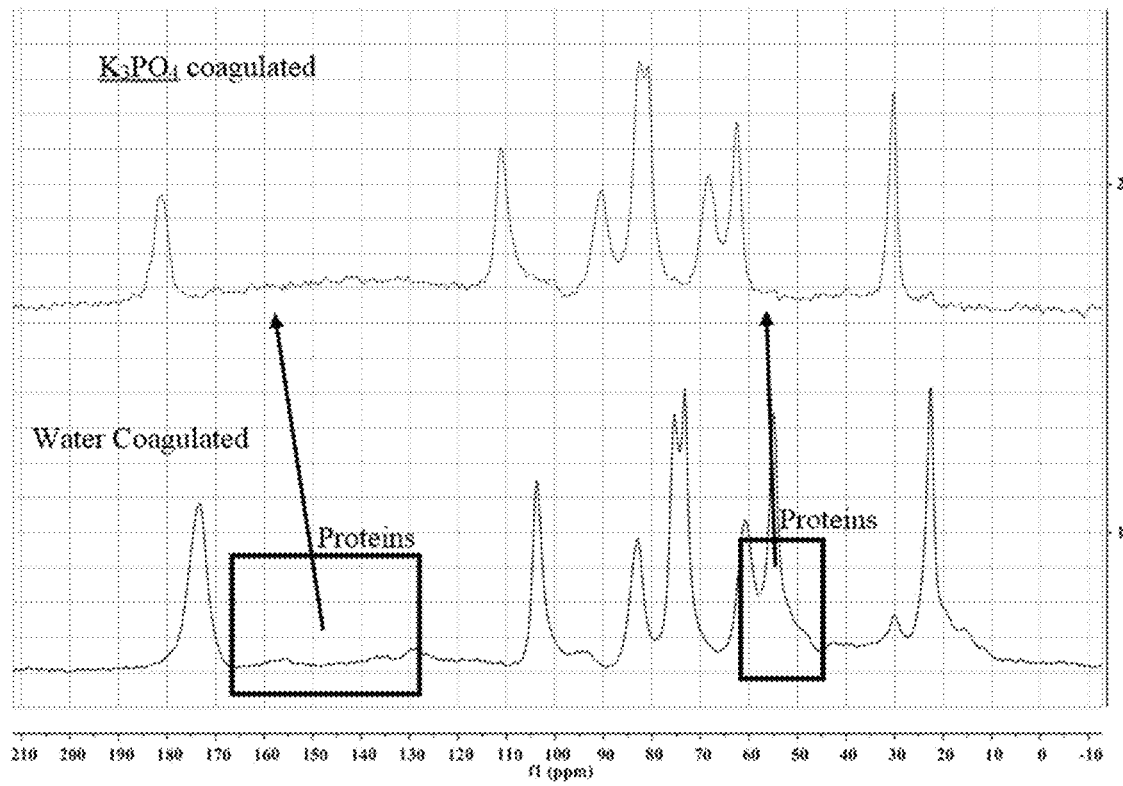
FIG. 16 shows a comparison of protein content after $K_3PO_4$ treatment from (1) salt-assisted method and (2) standard method.

In order to accurately quantify the proteins present in a sample, a standard curve for proteins were generated by use of bovine serum albumin (BSA) concentrations ranging from 5-125 μg/mL. Preparation of BSA samples was done in a phosphate buffer (pH 7.4/10 mM) matrix. Furthermore, the same phosphate buffer matrix was used for dilution of the alkali supernatant that are obtained from the protein removal step. The protein containing supernatants were diluted appropriately in order to obtain absorbance values that are falling in the linear absorbance range. As calculated from the standard curve, absorbance vs. concentration plot was found to be linear with r$^2$ value of 0.98. From the supernatants collected from the alkali treatment of each chitin sample, the total protein content of standard chitin was found to be 4.54±0.98 wt. %, whereas salt-assisted chitin contained 0.29±0.09 wt. % proteins (FIG. 16). By comparison, the chitin isolated using the salt-assisted methods contains approximately 15 times less protein impurities as compared to isolated chitin using the standard methods. Therefore, there is a significant improvement in the purity of the regenerated chitin when coagulated through the new salt-assisted method with respect to protein content in the final product. This conclusion is also in-line with the chemical nature of the coagulation solution, i.e., K$_3$PO$_{4(aq)}$, which has the capability to salt-out proteins at high salt concentrations (Freire M G et al. *Chem. Soc. Rev.* 2012, 41, 4966-4995; Black M and Schwartz H M. *Analyst* 1950, 75, 185-189; Valdez-Peña A U et al. *Food Sci. Biotechnol.* 2010, 19, 553-557).

Example 2. Reusability of the K3PO4-Rich Layer

During the standard coagulation, an anti-solvent such as water is added to ionic liquid-chitin mixture. Typically, these anti-solvents are relatively inexpensive, and therefore, may not be essential to recycle. However, the aqueous biphasic system-based coagulation method discussed herein employs a concentrated solution of K$_3$PO$_4$, which can be recycled.

Therefore, reusability of the $K_3PO_4$-rich layer obtained after coagulating chitin from the ionic liquid was studied.

The concentration and purity of the $K_3PO_4$-rich layer plays a role in the ability to recycle the $K_3PO_4$-rich layer. As estimated from the mass balance calculations in Table 1, the salt concentration of the bottom layer of the aqueous biphasic system is increased from 40 wt. % to ~50 wt. % (due to diffusion of some of the water into the ionic liquid phase). Therefore, the salt layer should be diluted by the addition of water prior to reuse. In addition, the $^1$H NMR studies and phase diagram calculations revealed that there is no significant levels of ionic liquid present in the salt-rich layer. In order to remove any solid impurities, the $K_3PO_4$-rich layer was filtered using a filter paper (Whatman 40) after dilution.

Figure 20:
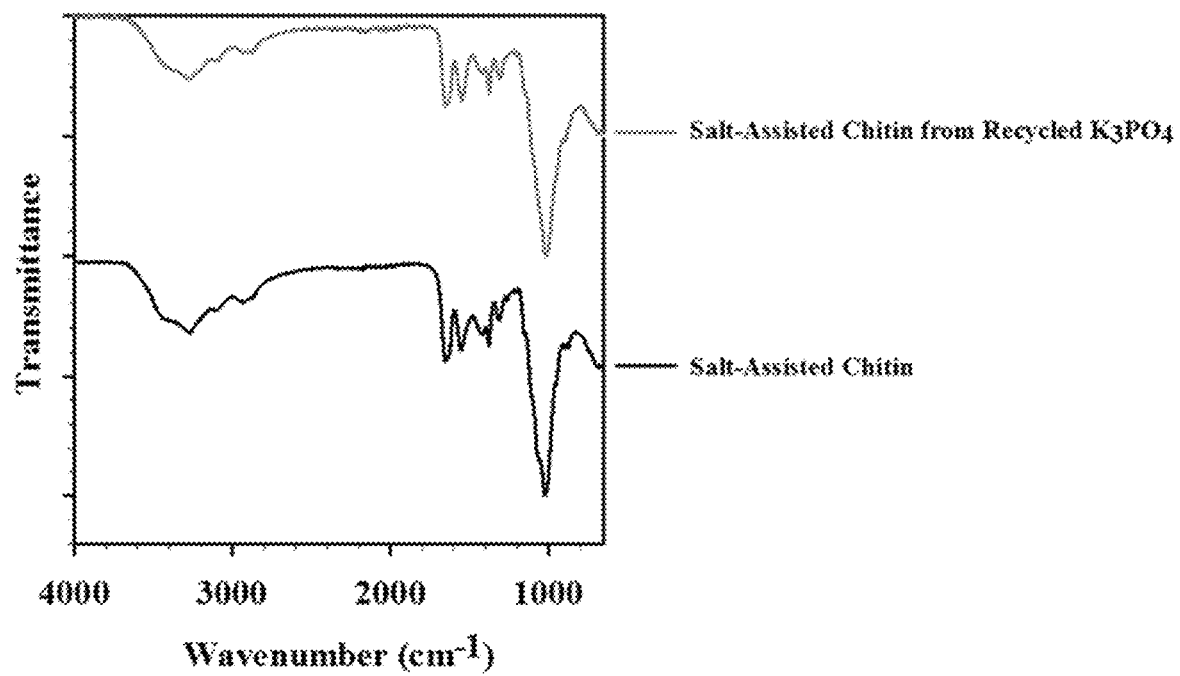
FIG. 20 is the FT-IR spectra of coagulated chitin flock after washing with water and sequential drying.
Figure 21:
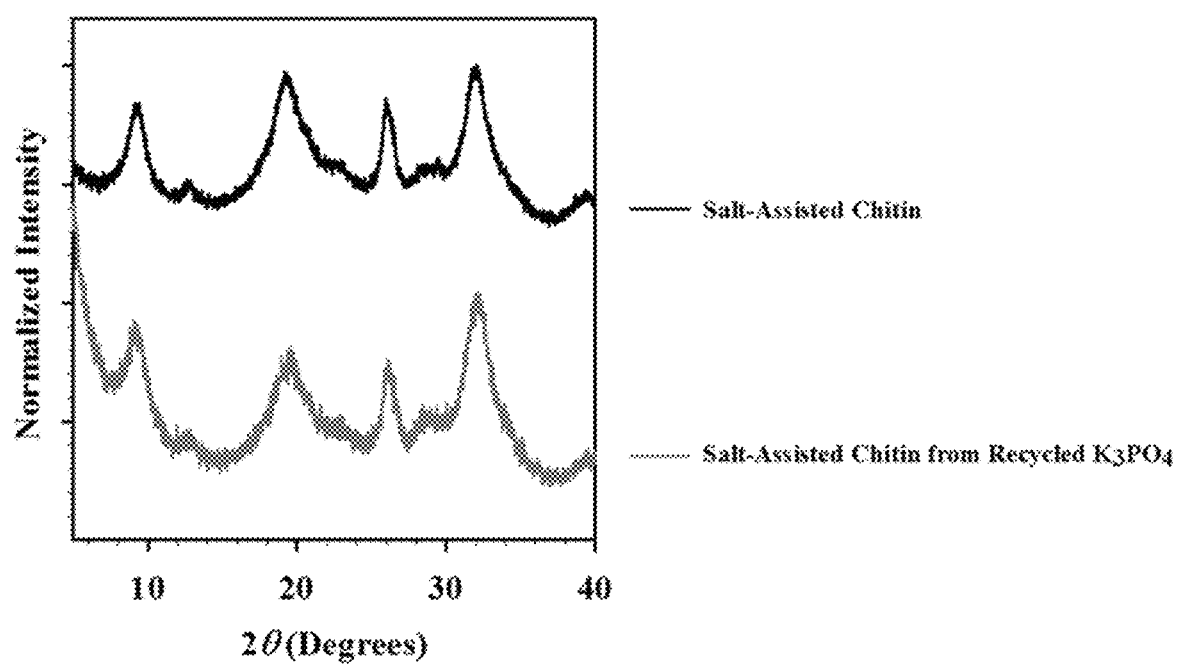
FIG. 21 is the pXRD spectra of coagulated chitin flock after washing with water and sequential drying.

A recycled (diluted and filtered) $K_3PO_4$ solution was used to coagulate chitin from dry shrimp shells, and the resulting chitin product was characterized using FTIR and Powder X-Ray Diffraction. A comparison of Powder X-Ray Diffraction and FTIR of chitin products, isolated from a new and recycled $K_3PO_4$, is given in FIGS. 20 and 21. As can be observed from the Powder X-Ray Diffraction and FTIR, both products display similar characteristics confirming that it is possible to recycle the $K_3PO_4$ layer efficiently.

Example 3. Coagulation of Chitin Extracted Using Ionic Liquid Via Microwave Irradiation (Without Stirring)

Figure 17:
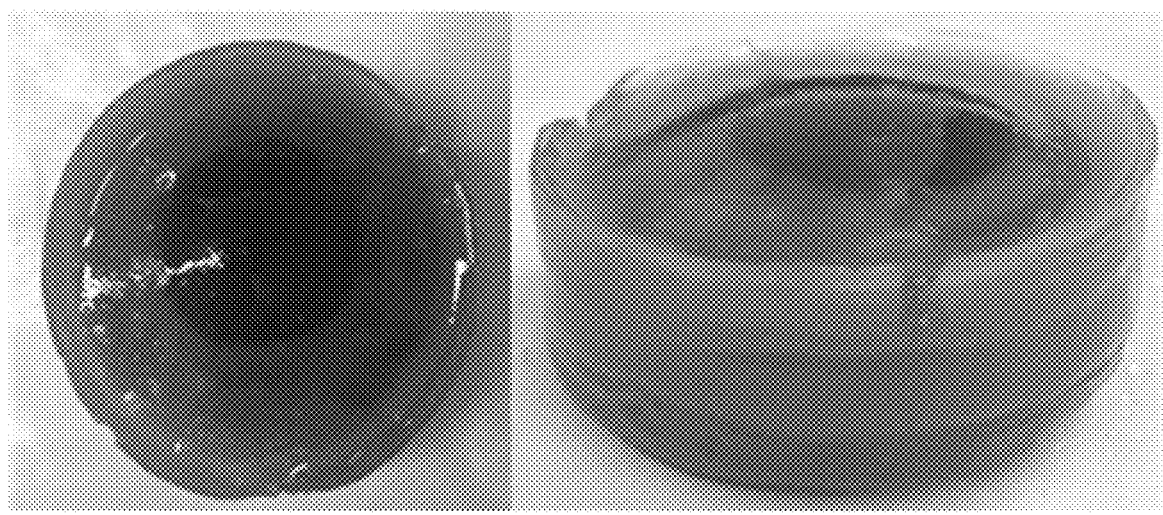
FIG. 17 is a photograph of coagulated chitin flock before washing with water.
Figure 18:
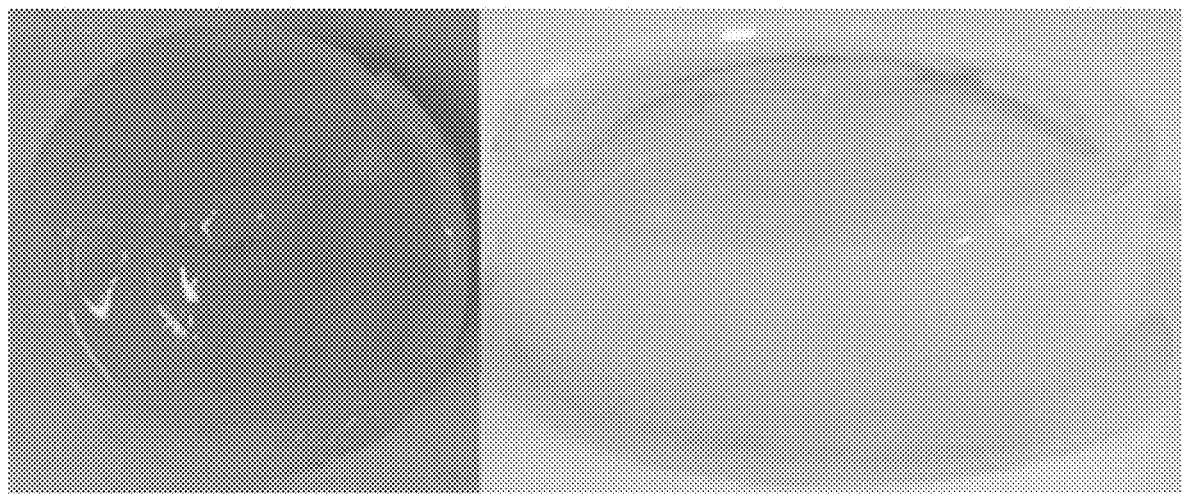
FIG. 18 is a photograph of coagulated chitin flock after washing with water.

The experiment was conducted as described above in Example 1, however the coagulation was conducted without stirring the two phases. Specifically, a 2 wt. % solution of dry shrimp shells was dissolved in the ionic liquid using microwave irradiation. Next a concentrated solution of $K_3PO_4$ ca. 40 wt. % was added to a 100 mL beaker, and the ionic liquid-chitin solution was poured on top of the salt layer. A ~2:1 w/w ratio of the $K_3PO_4$ and the ionic liquid-chitin layer was used. During coagulation, the system was not stirred. This method requires longer time for coagulation and generates a chitin flock after coagulation. The appearance of this chitin flock before and after washing with water is given in FIG. 17 and FIG. 18, respectively.

Example 4. Coagulation of Chitin Dissolved in the Ionic Liquid Using Thermal Dissolution The re-dissolution of chitins extracted from crustacean shells was achieved through thermal dissolution. A 0.20 g of dry, ground and sieved chitin was added on to a 20 mL glass screw-top vial containing 9.80 g of the ionic liquid (2 wt. % chitin loading). Then, the reaction mixture was heated for two to three hours with vigorous stirring (800-1000 rpm), in an oil bath at 100° C. The complete dissolution was carefully monitored by using an optical microscope (Reichert Stereo Star Zoom 580, Depew, N.Y.), ca. 6 hours, and coagulated using a concentrated solution of $K_3PO_4$ ca. 40 wt. %. The process and results appear similar to those of Example 1.

Example 5

Figure 19:
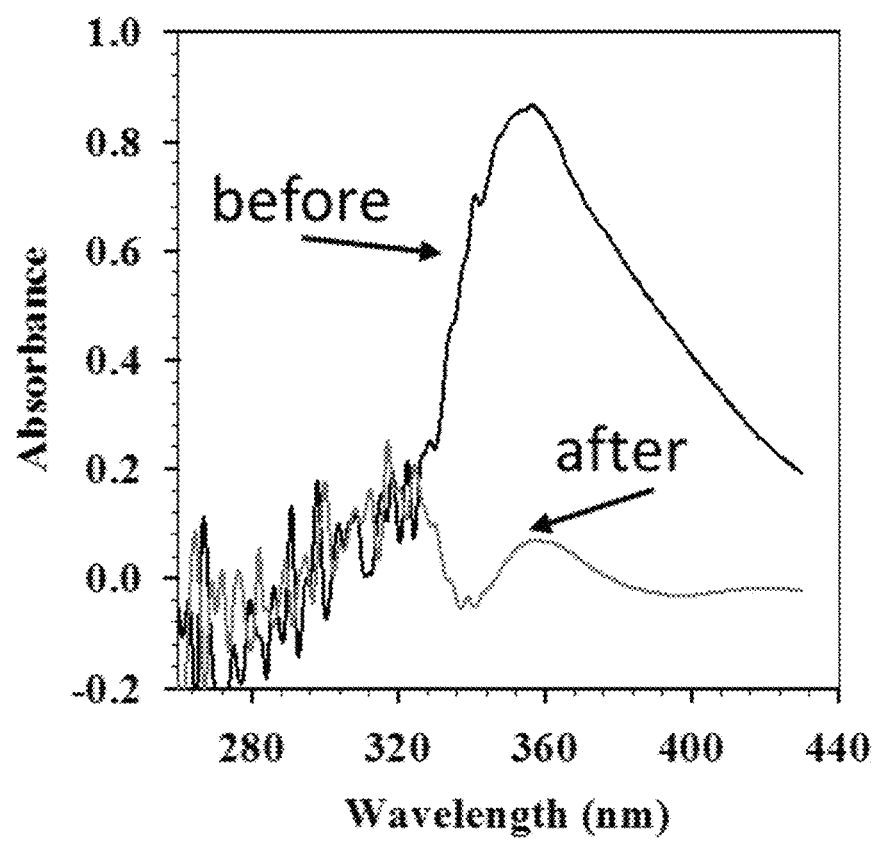
FIG. 19 is the UV-Vis absorption spectra of BSA before and after treatment.

This example focused on the evaluation of methods to remove protein from shrimp waste along with or after chitin extraction using the formation of a protein-phosphate complex as described elsewhere (Ventura S P et al. *J. Phys. Chem. B*, 2009, 113, 9304-9310). Bovine serum albumin (also known as BSA or "Fraction V"), a serum albumin protein derived from cows was used as a protein concentration standard in all experiments because the signature of BSA protein for many analytical techniques is known Commercial BSA was placed into an ionic liquid, to model the ionic liquid after chitin extraction. The BSA concentration was ca. 10 mg/mL of ionic liquid. A phosphate solution ($K_3PO_4$ ca. 40 wt. %) was added to the BSA-ionic liquid solution, and the system was equilibrated for 12 h, resulting in bi-phase formation. Afterwards, the BSA quantification in both layers was carried out by UV spectroscopy (the absorbance peak of BSA is located around 280 nm and with a distinct absorbance peak at ~360 nm). UV-Vis absorption spectra of BSA before and after the portioning are provided in FIG. 19. The concentration of BSA after treatment with $K_3PO_{4(aq)}$ (both methods) was calculated by using the following equations.

$$[BSA]_{after} = A_{after}/A_{before} \times [BSA]_{before}$$

$$[BSA]_{after} = 0.079/0.866 \times 10 \text{ mg/g} = 0.91 \text{ mg/g}$$

$$\% \text{ removed} = 100 - (0.91/10 \times 100) = 90.9\%$$

More than 90% of BSA has been removed from the ionic liquid layer indicating that $K_3PO_4$ has the ability to "extract" proteins from [$C_2$mim][OAc].

Example 6. Investigation of "Kosmotropic Salts Approach" for Purification of Protein-Contaminated Ionic Liquid Via Formation of Protein-Phosphate Complex A portion of ionic liquid was saturated (overnight) with 30 wt. % $K_3PO_{4(aq)}$ and BSA was dissolved at 65° C. overnight with a concentration of 2 mg/g. The system was equilibrated for 12 h to achieve complete partitioning of BSA. Then a biphasic solution was achieved with 30 wt. % $K_3PO_{4(aq)}$ (1:1). The BSA quantification in the ionic liquid layer was carried by UV spectroscopy, calculated as shown in the Example 3 and found to be 0.18 mg/g or 90.0%.

Example 7. Dehydration of Ionic Liquid Using the Aqueous Biphasic System Coupled to Evaporation Here, an evaporation method was coupled to the dehydration procedure in order to further dehydrate the ionic liquid. First, solid $K_3PO_4$ was added to aqueous ionic liquid solution (66% wet) to saturation, and the water content of the recovered ionic liquid layer was measured to be ~20 wt. %. Then, the recovered ionic liquid layer was further dehydrated using vacuum evaporation at 95° C. for 30 min to remove residual water. The water content of ionic liquid after dehydration was measured to be <6 wt. %.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

Example 8. Dehydration of Ionic Liquid Using the Aqueous Biphasic System 1.22 g of dried, sieved (125 μm) shrimp shells was dissolved by use of 60 mL of the IL. The IL-shrimp shell mixture was centrifuged to remove the undissolved materials. Then, the dissolved chitin was coagulated in 120 mL of water. Next, the system was stirred overnight. Afterwards, the system was centrifuged to remove chitin, and the IL-water layer was saved for recovery. Finally, the chitin layer was washed for 12 times to remove traces of ILs and impurities, and dried overnight at 85° C.

Figure 22A:
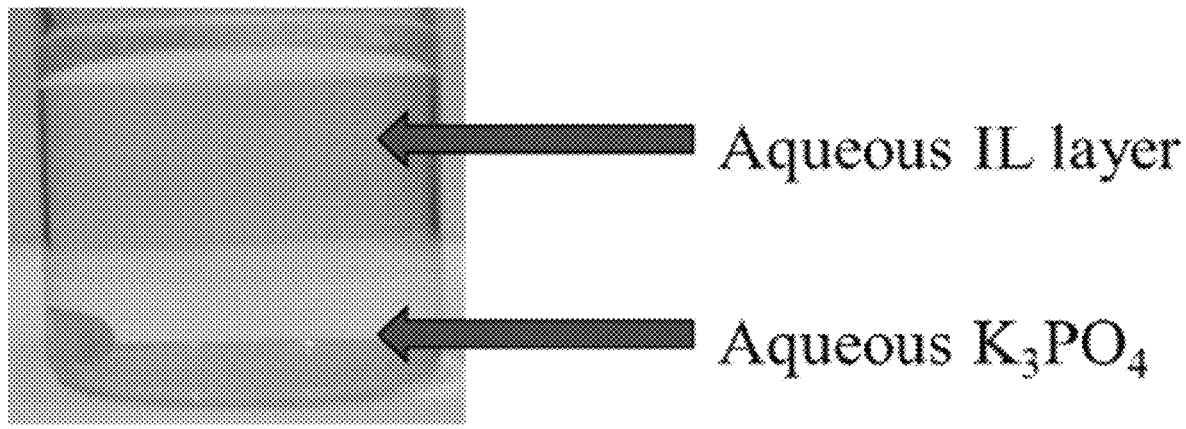
FIG. 22A is a photograph showing the formation of two layers after addition of 30 wt % aqueous solution of $K_3PO_4$ to wet IL.
Figure 22B:
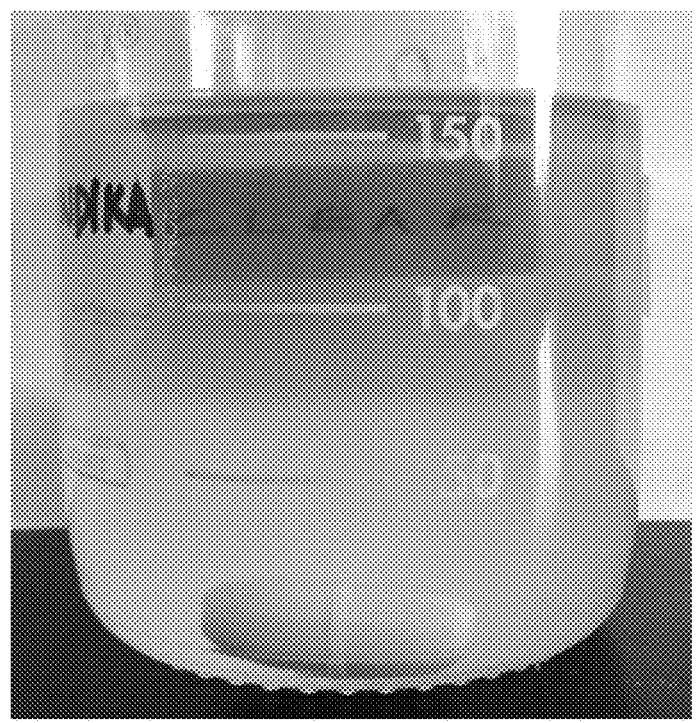
FIG. 22B is another photograph of the two layers.

The IL/water layer separated from the previous procedure was treated with $K_3PO_4$(s) in order to obtain an ABS system (FIGS. 22A and 22B). The water content of this layer was calculated to be 67%. Based on the color of the two layers, top layer is rich with the IL whereas, bottom layer is IL deficient. Also, the IL layer appears to be extremely clear while, the water layer is turbid. Based on the appearance of the water layer, the IL layer could be rich in proteins, which is considered to be the main impurity in the IL layer.

What is claimed is:

1. A method for separating and collecting chitin from a chitinous biomass and forming a recycled ionic liquid, the method comprising:
    contacting the chitinous biomass with an ionic liquid to form a mixture comprising chitin wherein the ionic liquid is a 3-alkyl-1-alkyl imidazolium $C_1$-$C_6$ carboxylate;
    contacting the mixture with an aqueous solution of a kosmotropic salt, thereby coagulating the chitin and forming a biphasic system comprising an ionic liquid-chitin phase and an aqueous kosmotropic salt phase, wherein the kosmotropic salt comprises $K_3PO_4$, $K_2HPO_4$, $Na_3PO_4$, $Na_2HPO_4$, $NaH_2PO_4$, or a combination thereof;
    separating the ionic liquid-chitin phase from the aqueous kosmotropic salt phase; and
    collecting the chitin from the separated ionic liquid-chitin phase, thereby forming the recycled ionic liquid;
    wherein the separated ionic liquid-chitin phase further comprises water and the amount of water in the separated ionic liquid-chitin phase is about 30 wt. % or less, such that the recycled ionic liquid further comprises water and the amount of water in the recycled ionic liquid is about 30 wt. % or less; and
    wherein the collected chitin comprises about 1 wt. % or less of a protein.

2. The method of claim 1, wherein the chitinous biomass comprises an arthropod biomass, a fungi biomass, or a combination thereof.

3. The method of claim 1, wherein the chitinous biomass comprises an arthropod biomass and the arthropod biomass comprises the exoskeleton of an arthropod chosen from the group consisting of shrimp, prawn, crayfish, crab, lobster, insect, and combinations thereof.

4. The method of claim 1, wherein the ionic liquid is 3-ethyl-1-methyl-imidazolium acetate, [$C_2$mim]OAc.

5. The method of claim 1, wherein contacting the chitinous biomass with the ionic liquid comprises heating the chitinous biomass in the ionic liquid to form the mixture.

6. The method of claim 5, wherein the chitinous biomass in the ionic liquid is heated at a temperature from about 0° C. to about 160° C.

7. The method of claim 5, wherein heating the chitinous biomass in the ionic liquid comprises microwave irradiating the chitinous biomass in the ionic liquid to form the mixture.

8. The method of claim 1, wherein the mixture comprises from about 1 to about 25 wt. % of chitin.

9. The method of claim 1, wherein the kosmotropic salt comprises $K_3PO_4$.

10. The method of claim 1, wherein the concentration of the kosmotropic salt in the aqueous solution is from about 0 wt. % to about 80 wt. %.

11. The method of claim 1, wherein the amount of water in the separated ionic liquid-chitin phase is about 20 wt. % or less.

12. The method of claim 1, wherein the chitin is collected from the separated ionic liquid-chitin phase by centrifugation or filtration.

13. The method of claim 1, wherein the collected chitin comprises about 0.5 wt. % or less of a protein.

14. The method of claim 1, further comprising washing the collected chitin with a solvent, wherein the solvent comprises methanol, ethanol, propanol, isopropanol, acetone, hexane, benzene, hexane, acetonitrile, water, or combinations thereof.

15. The method of claim 1, wherein the recycled ionic liquid is used to contact the chitinous biomass.

* * * * *